(12) United States Patent
Tenny et al.

(10) Patent No.: US 10,812,973 B2
(45) Date of Patent: Oct. 20, 2020

(54) SYSTEM AND METHOD FOR COMMUNICATING WITH PROVISIONED SECURITY PROTECTION

(71) Applicant: Futurewei Technologies, Inc., Plano, TX (US)

(72) Inventors: Nathan Edward Tenny, Poway, CA (US); Li Hu, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 230 days.

(21) Appl. No.: 15/987,192

(22) Filed: May 23, 2018

(65) Prior Publication Data

US 2019/0124506 A1 Apr. 25, 2019

Related U.S. Application Data

(60) Provisional application No. 62/574,581, filed on Oct. 19, 2017.

(51) Int. Cl.
*H04L 29/06* (2006.01)
*H04W 12/04* (2009.01)
(Continued)

(52) U.S. Cl.
CPC .............. *H04W 12/04* (2013.01); *H04W 4/50* (2018.02); *H04W 12/0401* (2019.01);
(Continued)

(58) Field of Classification Search
CPC ........ H04L 63/067; H04L 63/08; H04L 63/06
(Continued)

(56) References Cited

U.S. PATENT DOCUMENTS

| 9,247,471 B2 * | 1/2016 | Velev ...................... H04W 4/50 |
| 2008/0089294 A1* | 4/2008 | Shon .................... H04L 63/0869 370/331 |

FOREIGN PATENT DOCUMENTS

| EP | 2271145 A1 * | 3/2010 |
| EP | 2271145 A1 | 1/2011 |

OTHER PUBLICATIONS

"3rd Generation Partnership Project; Technical Specification Group Services and System Aspects; 3GPP System Architecture Evolution (SAE); Security architecture (Release 14)," 3GPP TS 33.401 V14.0.0, Sep. 2016, 152 pages.

(Continued)

*Primary Examiner* — Longbit Chai
(74) *Attorney, Agent, or Firm* — Slater Matsil, LLP

(57) ABSTRACT

A method for operating a user equipment (UE) includes receiving a security parameter provisioned for the UE, wherein the security parameter is secured using a first security key, after receiving the security parameter, communicating with the first device, wherein the communication with the first device is secured using the first security key, and performing a mobility related procedure in accordance with the security parameter provisioned for the UE, wherein performing the mobility related procedure includes triggering the mobility related procedure with a second device, deriving a second security key in accordance with the security parameter, the second security key is usable in the mobility related procedure, and securing at least one message of the mobility related procedure using the second security key.

36 Claims, 12 Drawing Sheets

(51) Int. Cl.
| | |
|---|---|
| *H04W 12/06* | (2009.01) |
| *H04W 76/19* | (2018.01) |
| *H04W 4/50* | (2018.01) |
| *H04W 76/27* | (2018.01) |
| *H04W 36/00* | (2009.01) |
| *H04W 36/08* | (2009.01) |
| *H04W 92/20* | (2009.01) |

(52) U.S. Cl.
CPC ..... *H04W 12/04031* (2019.01); *H04W 12/06* (2013.01); *H04W 36/0038* (2013.01); *H04W 36/08* (2013.01); *H04W 76/19* (2018.02); *H04W 76/27* (2018.02); *H04W 92/20* (2013.01); *H04L 63/0876* (2013.01)

(58) Field of Classification Search
USPC .......................................................... 726/4
See application file for complete search history.

(56) References Cited

OTHER PUBLICATIONS

"3rd Generation Partnership Project; Technical Specification Group Radio Access Network; Evolved Universal Terrestrial Radio Access (E-UTRA) Radio Resource Control (RRC); Protocol specification (Release 8)," 3GPP TS 36.331 V8.6.0, Jun. 2009, 207 pages.

Intel Corporation, "Security optimizations when resuming or re-establishing,"3GPP TSG RAN WG2 AdHoc Meeting, R2-1707040, Qingdao, China, Jun. 27-29, 2017, 6 pages.

Ericsson, "Addressing key FFS in email discussion [98#30][NR] RRC Connection Control," 3GPP TSG-RAN WG2 #98-AH, R2-1707298, Qingdao, China, Jun. 27-29, 2017, 3 pages.

"3rd Generation Partnership Project; Technical Specification Group Services and System Aspects; Rationale and track of security decisions in Long Term Evolved (LTE) RAN/3GPP System Architecture Evolution (SAE) (Release 9)," 3GPP TR 33.821, V9.0.0, Jun. 2009, 141 pages.

NTT DOCOMO, Inc., "Path Switch procedure for KeNB update in Intra eNB Handover and Inter eNB Handover," 3GPP RAN3#61bis, R3-082578, Prague, Czech, Sep. 29-Oct. 3, 2008, 7 pages.

Nokia Corporation, et al., "KeNB forward security simplification," 3GPP TSG SA WG3 Security—SA3#52, S3-080734, Sophia-Antipolis, France, Jun. 23-27, 2008, 3 pages.

* cited by examiner

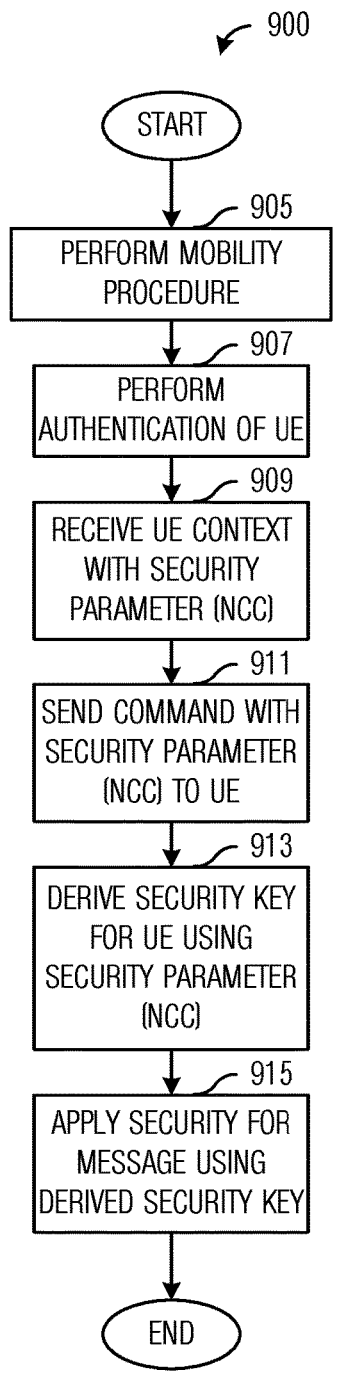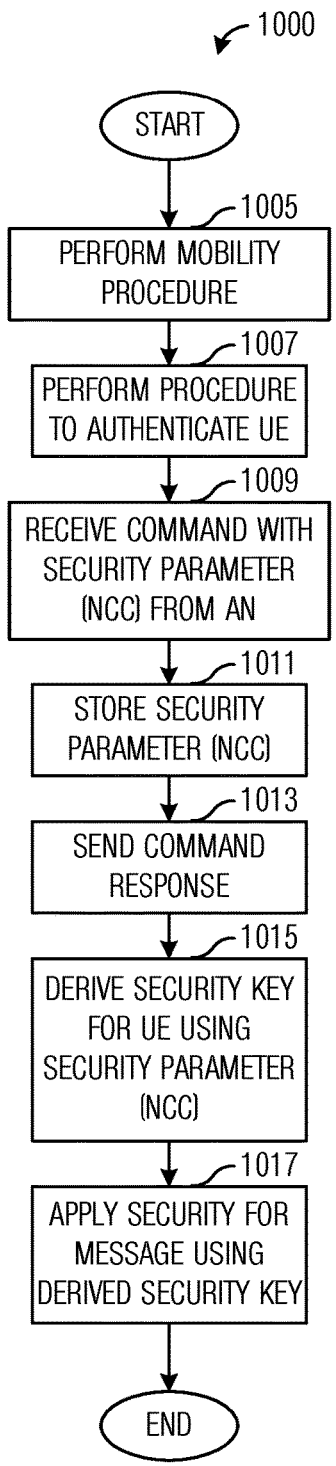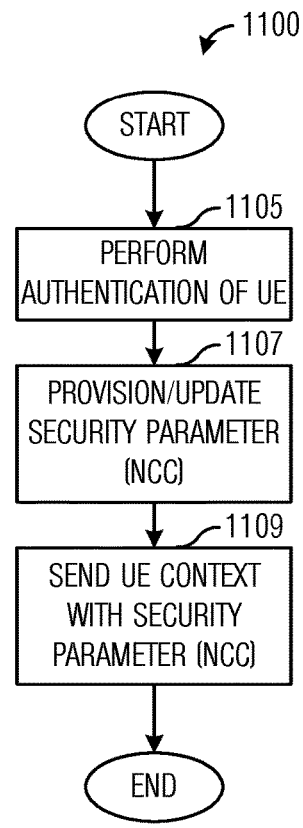
Fig. 9
Fig. 10
Fig. 11

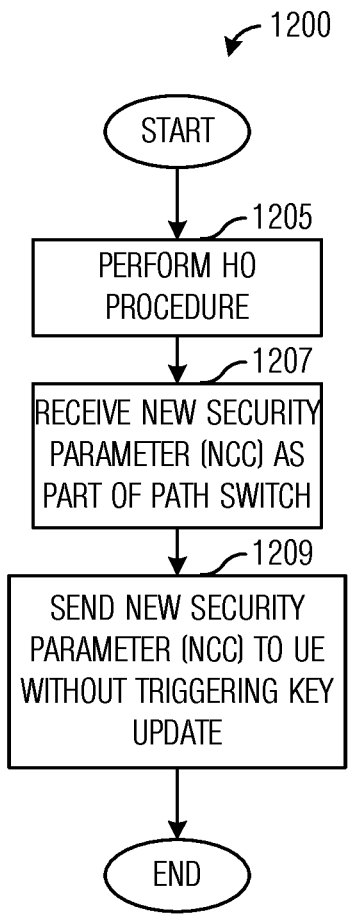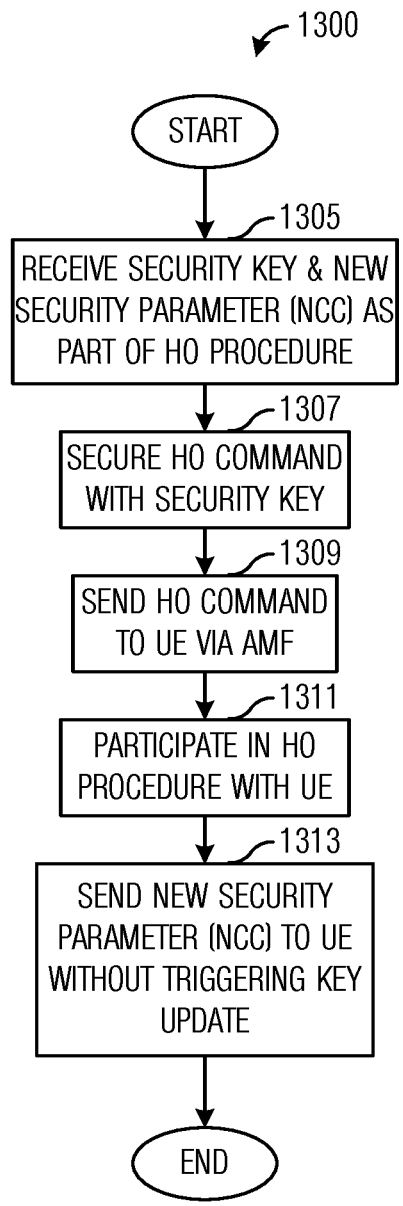
Fig. 12
Fig. 13

SYSTEM AND METHOD FOR COMMUNICATING WITH PROVISIONED SECURITY PROTECTION

This application claims the benefit of U.S. Provisional Application No. 62/574,581, filed on Oct. 19, 2017, entitled "System and Method for Communicating with Provisioned Security Protection," which application is hereby incorporated by reference in its entirety.

TECHNICAL FIELD

The present disclosure relates generally to a system and method for digital communications, and, in particular embodiments, to a system and method for communicating with provisioned security protection.

BACKGROUND

In the Fifth Generation (5G) New Radio (NR) system architecture, a new radio resource control (RRC) state has been proposed. In the new RRC state referred to as RRC_INACTIVE, a context of a user equipment (UE) (commonly referred to as the UE context) is held in the network, by an anchor node (typically the last serving Next Generation NodeB (gNB)).

The UE in the RRC_INACTIVE state is able to move freely, without exchanging mobility signaling with network nodes, within a radio access network (RAN) defined area. If the UE moves to a new area, a RAN location area update (RLAU) is performed to update the location of the UE. The operation of the RLAU may be similar to the operation of a tracking area update (TAU) at the core network (CN) level. Mobility of the UE in the RRC_INACTIVE state may use a cell reselection procedure.

In the 5G NR system architecture, the UE in the RRC_INACTIVE state does not maintain a security association with the serving gNB. Instead, the security material is stored as part of the UE context maintained at the anchor gNB. The stored security material may include current security keys, key derivation parameters, and so on. The stored security material may be used when the UE needs to transition to an RRC_CONNECTED state, or when other procedures requiring security are performed.

SUMMARY

Example embodiments provide a system and method for communicating with provisioned security protection.

In accordance with an example embodiment, a method for operating a user equipment (UE) is provided. The method includes receiving, by the UE from a first device, a security parameter provisioned for the UE, wherein the security parameter is secured using a first security key, after receiving the security parameter, communicating, by the UE with the first device, wherein the communication with the first device is secured using the first security key, and performing, by the UE, a mobility related procedure in accordance with the security parameter provisioned for the UE, wherein performing the mobility related procedure includes triggering, by the UE, the mobility related procedure with a second device, deriving, by the UE, a second security key in accordance with the security parameter, the second security key is usable in the mobility related procedure, and securing, by the UE, at least one message of the mobility related procedure using the second security key.

Optionally, in any of the preceding embodiments, further includes storing, by the UE in a memory, the security parameter.

Optionally, in any of the preceding embodiments, wherein the mobility related procedure comprises one of a handover or a connection re-establishment procedure.

Optionally, in any of the preceding embodiments, wherein the second security key is further derived in accordance with information associated with the second device.

Optionally, in any of the preceding embodiments, wherein the information comprises an identifier associated with the second device.

Optionally, in any of the preceding embodiments, wherein the identifier is a cell identifier of a cell operated by the second device.

Optionally, in any of the preceding embodiments, wherein the first device comprises a source access node and the second device comprises a target access node.

In accordance with an example embodiment, a method for operating an access node (AN) is provided. The method includes receiving, by the AN, a context for a UE, the context including a security parameter provisioned for the UE, wherein the security parameter comprises an input for key generation by the UE, sending, by the AN to the UE, a command secured by the AN using a security key generated in accordance with the security parameter, and performing, by the AN, a mobility related procedure using the security key, wherein performing the mobility related procedure includes sending, by the AN to the UE, at least one message of a first mobility related procedure associated with the UE, wherein the at least one message is secured by the AN using the security key.

Optionally, in any of the preceding embodiments, wherein sending the command to the UE comprises sending the command to a second AN for delivery to the UE.

Optionally, in any of the preceding embodiments, wherein participating in the mobility related procedure further includes deriving, by the AN, the security key associated with the UE, wherein the security key is derived in accordance with the security parameter, and securing, by the AN, the at least one message of the first mobility related procedure using the security key.

Optionally, in any of the preceding embodiments, wherein the security parameter comprises a next-hop chaining count (NCC) parameter.

Optionally, in any of the preceding embodiments, wherein receiving the context and sending the command are part of a connection establishment procedure between the UE and the AN.

Optionally, in any of the preceding embodiments, wherein the context is received from an access and mobility management function (AMF).

Optionally, in any of the preceding embodiments, further comprising performing, by the AN, a second mobility related procedure with the UE before receiving the context for the UE.

Optionally, in any of the preceding embodiments, wherein the second mobility related procedure comprises a connection establishment procedure.

In accordance with an example embodiment, a method for operating a device is provided. The method includes deriving, by the device, a provisioned security parameter for a UE during a mobility procedure, sending, by the device to a first AN, the provisioned security parameter, receiving, by the device from the first AN, a mobility command, and sending, by the device to the UE, the mobility command and the provisioned security parameter.

Optionally, in any of the preceding embodiments, wherein the mobility command is secured by the device using a security key derived in accordance with the provisioned security parameter.

Optionally, in any of the preceding embodiments, wherein sending the mobility command and the provisioned security parameter comprises sending the mobility command and the provisioned security parameter to a second AN for forwarding to the UE.

Optionally, in any of the preceding embodiments, wherein the second AN comprises a source AN, and wherein the first AN comprises a target AN.

Optionally, in any of the preceding embodiments, wherein the device comprises an AMF.

In accordance with an example embodiment, a UE is provided. The UE includes a memory storage comprising instructions, and one or more processors in communication with the memory storage. The one or more processors execute the instructions to receive, from a first device, a security parameter provisioned for the UE, wherein the communication of the security parameter is secured using a first security key, after receiving the security parameter, communicate with the first device, wherein the communication with the first device is secured by the UE using the first security key, and perform a mobility related procedure in accordance with the security parameter provisioned for the UE, wherein performing the mobility related procedure comprises the one or more processors executing instructions to trigger the mobility related procedure with a second device, derive a second security key in accordance with the security parameter, the second security key is usable in the mobility related procedure, and secure at least one message of the mobility related procedure using the second security key.

Optionally, in any of the preceding embodiments, wherein the one or more processors further execute the instructions to store the security parameter.

Optionally, in any of the preceding embodiments, wherein the one or more processors further execute the instructions to derive the second security key in accordance with information associated with the second device.

In accordance with an example embodiment, an AN is provided. The AN includes a memory storage comprising instructions, and one or more processors in communication with the memory storage. The one or more processors execute the instructions to receive a context for a UE, the context including a security parameter provisioned for the UE, wherein the security parameter comprises an input for key generation by the UE, send, to the UE, a command secured by the AN using a security key generated in accordance with the security parameter, and perform a mobility related procedure using the security key, wherein performing the mobility related procedure comprises the one or more processors executing instructions to send, to the UE, at least one message of a first mobility related procedure associated with the UE, wherein the at least one message is secured by the AN using the security key.

Optionally, in any of the preceding embodiments, wherein the one or more processors further execute the instructions to derive the security key associated with the UE, wherein the security key is derived in accordance with the security parameter, and secure the at least one message of the first mobility related procedure using the security key.

Optionally, in any of the preceding embodiments, wherein the one or more processors further execute the instructions to perform a second mobility related procedure with the UE before receiving the context for the UE.

Practice of the foregoing embodiments enables the signaling associated with handover or connection re-establishment procedures to match the signaling associated with a connection resumption procedure, with all procedures using a pre-provisioned security parameter. Consistent signaling helps to improve compatibility while simplifying design and implementation.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 9 illustrates a flow diagram of example operations occurring in an AN provisioning a security parameter for a UE according to example embodiments described herein;

FIG. 10 illustrates a flow diagram of example operations occurring in a UE being provisioned a security parameter according to example embodiments described herein;

FIG. 11 illustrates a flow diagram of example operations occurring in an AMF participating in the provisioning of a security parameter for a UE according to example embodiments described herein;

FIG. 12 illustrates a flow diagram of example operations occurring in a target AN updating a security parameter of a UE according to example embodiments described herein;

FIG. 13 illustrates a flow diagram of example operations occurring in a target AN participating in an N2 HO procedure according to example embodiments described herein;

DETAILED DESCRIPTION OF ILLUSTRATIVE EMBODIMENTS

The making and using of the disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
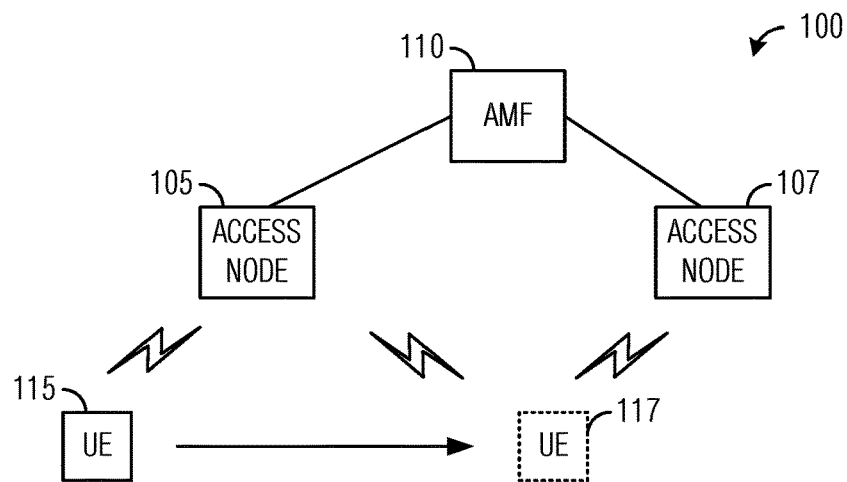
FIG. 1 illustrates an example wireless communications system according to example embodiments described herein.

FIG. 1 illustrates an example wireless communications system 100. Communications system 100 includes a plurality of access nodes (ANs), including a first AN 105 and a second AN 107. As shown in FIG. 1, first AN 105 and second AN 107 are connected to an access and mobility management function (AMF) 110. AMF 110 provides access or mobility control functionality, similar to a mobility management entity (MME) in The Third Generation Partnership Project (3GPP) Long Term Evolution (LTE) series of technical standards.

Communications system 100 also includes a user equipment (UE) 115. UE 115 may be mobile. Initially, UE 115 is served by first AN 105. However, as UE 115 moves about, it may leave the coverage area of first AN 105 and enter the coverage area of second AN 107. When UE 115 is in the coverage area of second AN 105, UE 115 is referred to as UE 117 and is shown using dotted lines to help reduce confusion.

In a cellular operating mode, communications to and from a UE go through an AN, while in a device to device communications mode, such as proximity services (ProSe) operating mode, for example, direct communication between UEs is possible. ANs may also be commonly referred to as Node Bs, evolved Node Bs (eNBs), gNBs, master eNBs (MeNBs), secondary eNBs (SeNBs), master gNBs (MgNBs), secondary gNBs (SgNBs), network controllers, control nodes, base stations, access points, and so on, while UEs may also be commonly referred to as mobile stations, mobiles, terminals, users, subscribers, stations, and the like. While it is understood that communications systems may employ multiple eNBs capable of communicating with a number of UEs, only two AN, one AMF, and one UE are illustrated for simplicity.

In the 5G NR system architecture, a UE may be in one of several RRC states: RRC_INACTIVE, RRC_IDLE, and RRC_CONNECTED, depending upon factors such as connection status, UE context status, and so on. In order for a UE that is in the RRC_INACTIVE state to transition to the RRC_CONNECTED state, the UE performs a re-activation procedure (which may be alternatively described as a resume procedure). The re-activation or resume procedure is similar to a connection re-establishment procedure, where the UE performs a random access procedure with a serving AN and identifies itself to a serving AN. The serving AN may retrieve the UE context of the UE from an anchor AN, allowing the serving AN to quickly bring the UE into the RRC_CONNECTED state.

In a proposal presented for consideration for inclusion in the 5G NR system architecture specifications, a next-hop chaining count (NCC) parameter is provisioned to a UE when the UE is sent to the RRC_INACTIVE state.

Figure 2:
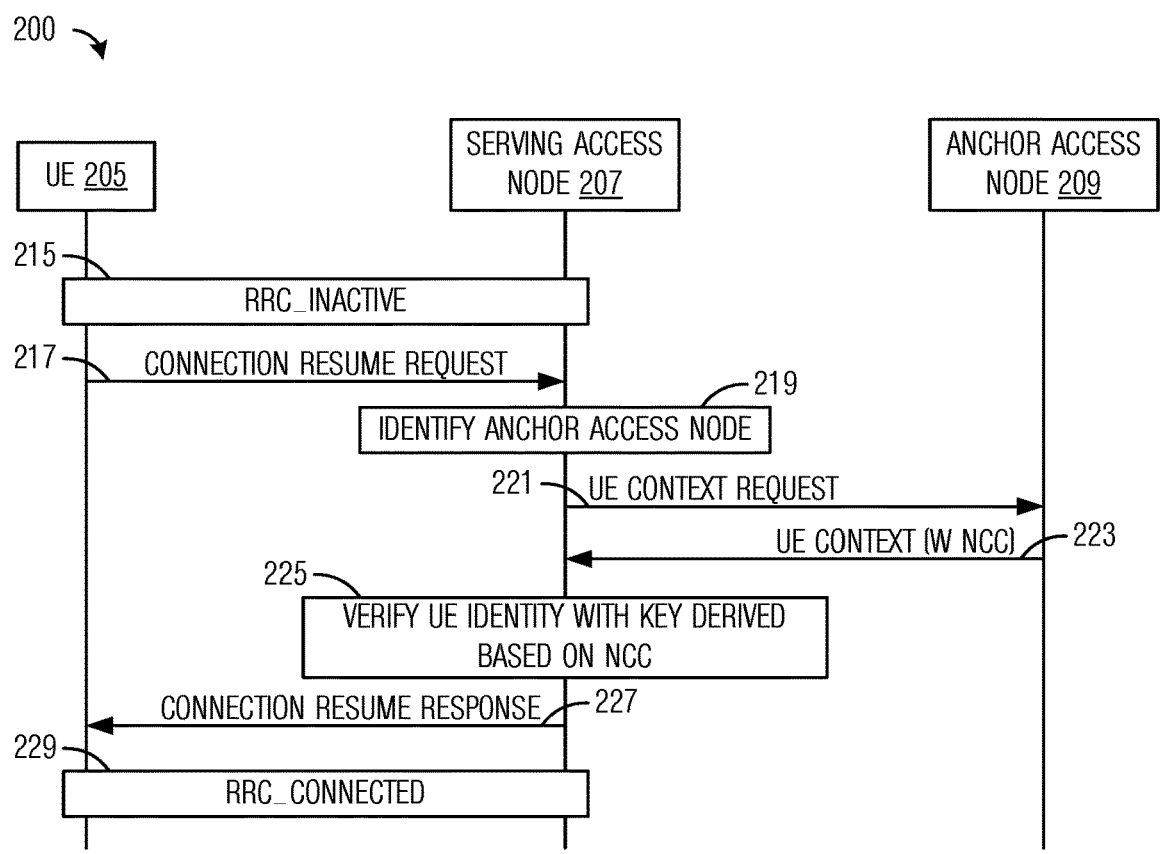
FIG. 2 illustrates a diagram highlighting communications exchanged and processing performed by devices participating in the provisioning of a new NCC for a UE transitioning from RRC_INACTIVE to RRC_CONNECTED states.

FIG. 2 illustrates a diagram 200 highlighting communications exchanged and processing performed by devices participating in the provisioning of a new NCC for a UE transitioning from RRC_INACTIVE to RRC_CONNECTED states. Diagram 200 highlights communications exchanged and processing performed by a UE 205, a serving AN 207, and an anchor AN 209 participating in the provisioning of a new NCC for a UE transitioning from RRC_INACTIVE to RRC_CONNECTED states.

Initially, UE 205 is in the RRC_INACTIVE state (block 215). However, UE 205 is to transition to the RRC_CONNECTED state. In order to do so, UE 205 participates in a connection resume procedure. UE 205 initiates the connection resume procedure by sending a connection resume request to serving AN 207 (event 217). Serving AN 207 identifies an AN that serves as the anchor AN (e.g., anchor AN 209) for UE 205 (block 219) and sends a UE context request to anchor AN 209 (event 221). Anchor AN 209 replies with the UE context of UE 205, which includes a new NCC provisioned for UE 205 (event 223). Serving AN 207 verifies the identity of UE 205 using a security key derived in accordance with the new NCC (block 225). With the identity of UE 205 verified, serving AN 207 sends a connection resume response to UE 205 (event 227) and UE 205 transitions to the RRC_CONNECTED state (block 229).

In a situation when a UE attempts to resume its connection and an error occurs, the UE then attempts to perform a connection re-establishment. Under the proposal described above, the UE then has already taken a new security key into use. However, the legacy 3GPP LTE re-establishment procedure assumes that the UE is using an old security key. As an example, a short MAC-I information element (IE) used for authentication is derived from the old security key because the old security key is the only security key shared between the serving AN and the UE. Therefore, it is reasonable to have the re-establishment procedure use the old security key. However, to simplify the UE implementation and prevent having to maintain two valid keys during the resume procedure, it is preferable to have the re-establishment procedure use the new security key, at variance with the approach used in LTE.

The re-establishment procedure uses the handover (HO) preparation information, therefore, the design of the re-establishment procedure should be compatible with the design of the HO procedure. Hence, it also makes sense to have a HO procedure that uses the new security key. In such a situation, a security parameter (such as the NCC) may be pre-provisioned at any time and be applied by the UE for future general mobility events, e.g., connection resume, connection re-establishment, or HO, with a uniform procedure. The security parameter (such as the NCC) may be consistently delivered to the UE as soon as it is available at the serving AN, and subsequently used for later mobility procedures (e.g., handover, connection establishment, connection resume, or connection re-establishment).

According to an example embodiment, a security parameter is pre-provisioned for a UE and is used for security purposes in subsequent mobility procedures. An example of the security parameter is the NCC. As an illustrative example, an AMF of a communications system generates a new NCC for a UE and delivers the new NCC to an AN, and the AN provisions (or set aside, supply, and so forth) the UE with the new NCC for future mobility procedure. The NCC may be associated with other security parameters, such as a next hop (NH) parameter, for example.

According to an example embodiment, in an Xn HO, which is a HO involving an Xn interface, a source AN provides, to a target AN, a UE context including a new security key information based on the security parameter provisioned to the UE.

According to an example embodiment, in an N2 HO, which is a HO involving an N2 interface, the AMF provides to a target AN, a new {NH, security parameter} information pair, which is used to derive a new security key. The new security parameter may be further provided to the UE, for example, by a source AN. As an illustrative example, the new security parameter (e.g., NCC) used to derive the second new key is provided to the UE at the time when the target AN begins to use its own security information. In an embodiment, this may mean that the new NCC is provided along with the HO command. In other words, the new NCC is provided to the UE in a media access control (MAC) control element (CE), as part of a packet data convergence protocol (PDCP) header, or similar lower layer signaling outside of the security protected portion of the message. In another embodiment, this may mean that the new NCC is sent after the N2 HO, in a first message where security is provided by the target AN.

In general, for all mobility related procedures (such as, HO, connection resume, or connection re-establishment), the UE uses the security key associated with the provisioned NCC as received.

Figure 3:
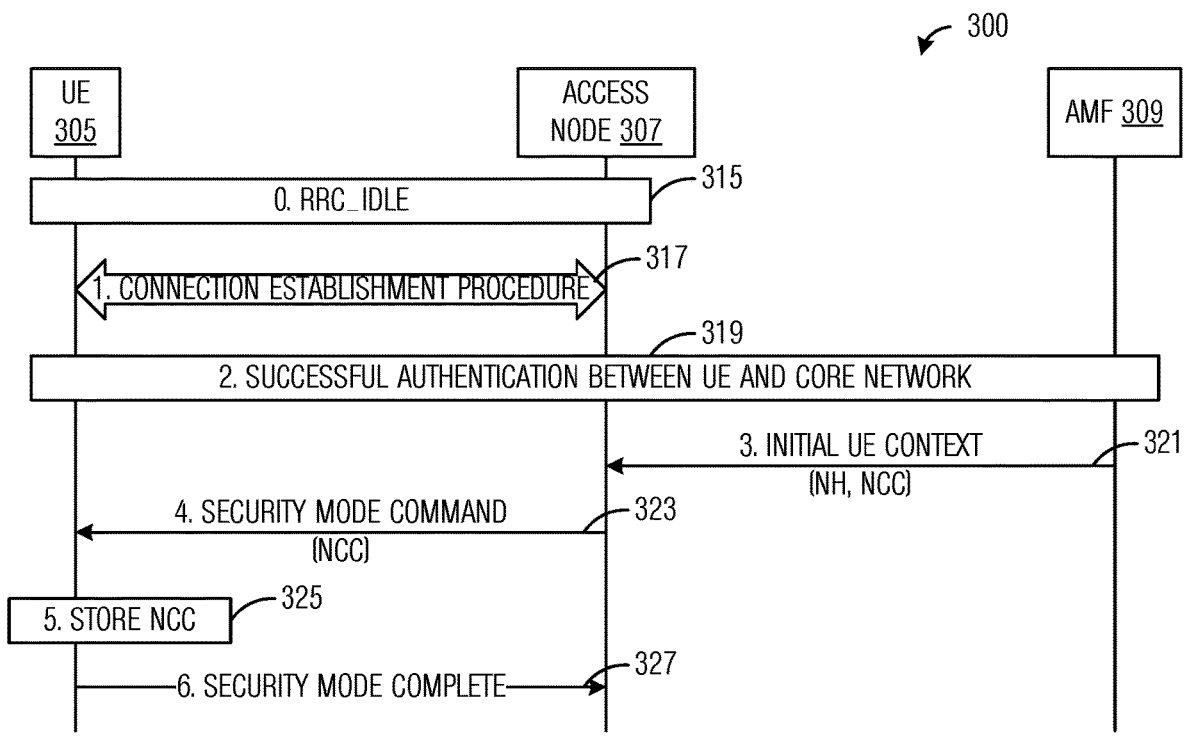
FIG. 3 illustrates a diagram highlighting communications exchanged and processing performed by devices participating in the provisioning of a security parameter for a UE transitioning from RRC_IDLE to RRC_CONNECTED states according to example embodiments described herein.

FIG. 3 illustrates a diagram 300 highlighting communications exchanged and processing performed by devices participating in the provisioning of a security parameter for a UE transitioning from RRC_IDLE to RRC_CONNECTED states. Diagram 300 highlights communications exchanged and processing performed by a UE 305, an AN 307, and an AMF 309 participating in the provisioning of a security parameter (e.g., a new NCC) for UE 305 as UE transitions from RRC_IDLE to RRC_CONNECTED states.

Initially, UE 305 is in the RRC_IDLE state (block 315). However, UE 305 is to transition to the RRC_CONNECTED state. In order to do so, UE 305 and AN 307 participate in a connection establishment procedure (event 317). After the successful completion of an authentication procedure for UE 305 and the CN (block 319), AMF 309 provides an initial UE context of UE 305 to AN 307 (event 321). The UE context includes, amongst other things, a new {NH, security parameter} information pair. AN 307 sends a security mode command to establish security at UE 305 (event 323). The security mode command includes the security parameter, e.g., the new NCC received from AMF 309. UE 305 stores the security parameter (block 325) and sends a security mode complete response to AN 307 (event 327). UE 305 successfully transitions to the RRC_CONNECTED state when security has been established.

It is noted that the provisioning of the security parameter during the transition from RRC_IDLE to RRC_CONNECTED states and the providing of the security parameter to UE 305 with the security mode command are for illustrative purposes only. The security parameter may be provided to UE 305 in a variety of other messages, such as in an RRCConnectionReconfiguration message, whenever AMF 309 updates the security parameter, for example. As another example, the security parameter may be provided to UE 305 during a transition from RRC_INACTIVE to RRC_CONNECTED states after UE 305 has transitioned to the RRC_CONNECTED state, where AN 307 may provision a new NCC (based on the new {NH, security parameter} information pair, for example).

Figure 4:
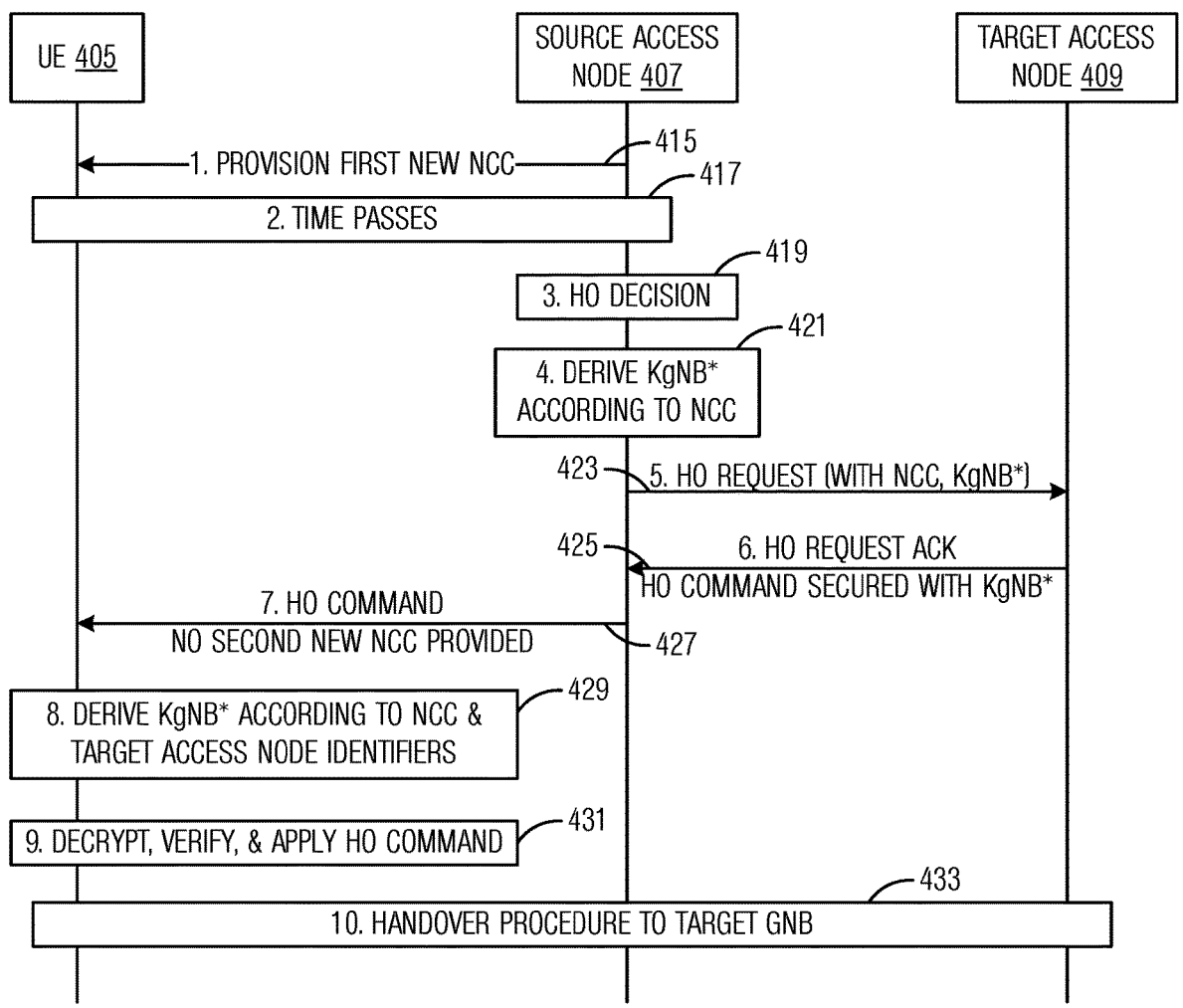
FIG. 4 illustrates a diagram highlighting communications exchanged and processing performed by devices participating in the provisioning of a security parameter for a UE during an Xn HO according to example embodiments described herein.

FIG. 4 illustrates a diagram 400 highlighting communications exchanged and processing performed by devices participating in the provisioning of a security parameter for a UE during an Xn HO. Diagram 400 highlights communications exchanged and processing performed by a UE 405, a source AN 407, and a target AN 409 participating in the provisioning of a security parameter (e.g., a new NCC) for UE 405 during an Xn HO.

Source AN 407 has knowledge of the security parameter (e.g., an NCC), from a legacy security procedure, for example, that is to be provisioned to UE 405 and sends the security parameter to UE 405 (event 415). In other words, event 415 comprises provisioning the security parameter to UE 405. UE 405 is mobile, and over time (block 417), UE 405 moves out of coverage of source AN 407 or the quality of a channel between UE 405 and source AN 407 otherwise drops. Source AN 407 determines that UE 405 should handover to another AN (block 419). Source AN 407 derives a new security key, e.g., KgNB*, in accordance with the security parameter (block 421). The new security key may also be derived in accordance with information associated with target AN 409, which was identified as a potential candidate AN for UE 405. The information associated with target AN 409 may include one or more identifiers of target AN 409.

Source AN 407 sends a HO request message to target AN 409 (event 423). The derivation of the new security key and the sending of the HO request message to target AN 409 may be similar to the legacy HO procedure. The HO request message may include the security parameter and the new security key. Target AN 409 sends a HO request acknowledgement to source AN 407 (event 425). The HO request acknowledgement may comprise a HO command to be forwarded to the UE. As an example, the HO request acknowledgement comprises the HO command secured (e.g., encrypted or signed) with the new security key. The HO command may be carried to the UE by a variety of messages, such as an RRCConnectionReconfiguration message, for example. It is noted that the securing of the HO command with the new security key is different from the legacy HO procedure.

Source AN 407 sends the HO command to UE 405 (event 427). Source AN 407 may send the encrypted container comprising the HO command to UE 405, but may not include the security parameter. UE 405 is expected to know to use the security parameter previously received from source AN 407, in event 415, for example. It is noted that the absence of the security parameter with the HO command may be an implicit indicator to UE 405 to not change its stored version of the security parameter. UE 405 derives the new security key KgNB* in accordance with the security parameter (block 429). The new security key KgNB\* may also be derived in accordance with information associated with target AN 409. For example, a cell identifier of target AN 409 may be an input parameter for the derivation of the new security key KgNB\*. UE 405 decrypts and verifies the HO command, as well as applies the HO command (block 431). UE 405 uses the new security key to interpret the HO command, as well as verify the identity of target AN 409. As an example, if UE 405 uses information associated with a different target AN, the HO command would not decrypt properly. The application of the HO command results in the completion of the HO procedure using the new security key and UE 405 is now served by target AN 409 (block 433).

Figure 5:
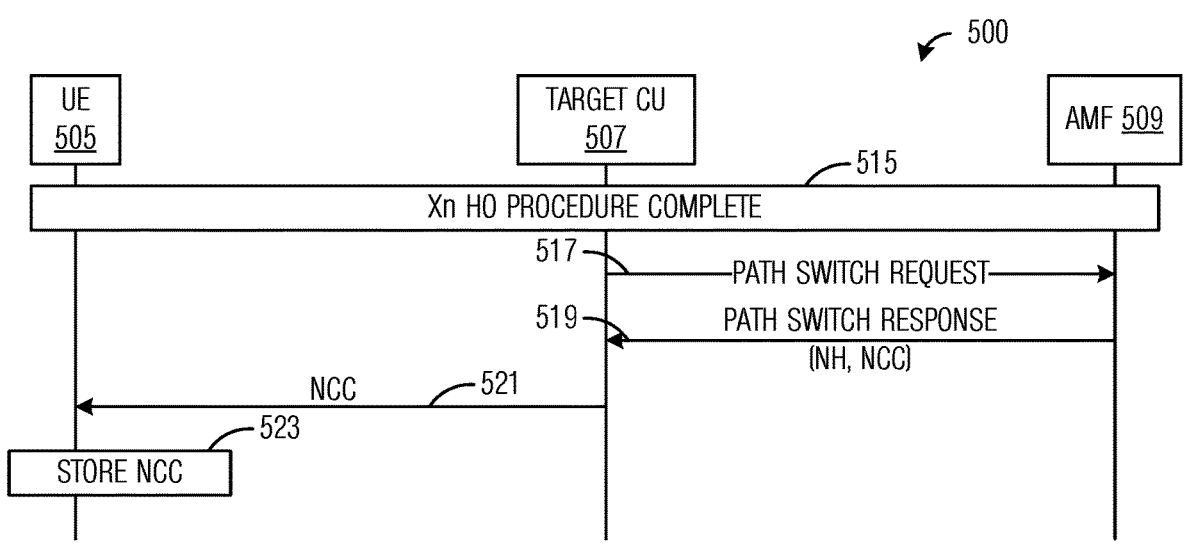
FIG. 5 illustrates a diagram highlighting communications exchanged and processing performed by devices participating in a security parameter update after an Xn HO completes according to example embodiments described herein.

FIG. 5 illustrates a diagram 500 highlighting communications exchanged and processing performed by devices participating in a security parameter update after an Xn HO completes. Diagram 500 highlights communications exchanged and processing performed by a UE 505, a target centralized unit (CU) 507, and an AMF 509 participating in a security parameter (such as an NCC) update after an Xn HO completes. The 5G NR system architecture includes a design that divides radio network functionality between CUs and distributed units (DUs), with at least the upper layers, e.g., the user plane comprising the PDCP sublayer and the control plane comprising the PDCP+RRC sublayers would be in the CUs, while the physical (PHY) sublayer would be in the DUs. Intervening Layer 2 sublayers may be in either the CUs or the DUs. The CU may be considered as the upper layer portion of an AN, e.g., a gNB.

After the Xn HO procedure completes (block 515), target CU 507, which controls a DU that is serving UE 505, sends a path switch request to AMF 509 (event 517). AMF 509 responds by sending a path switch response to target CU 507 (event 519). The path switch response includes a new {NH, security parameter} information pair. Target CU 507 sends the security parameter to UE 505 (event 521), which stores the security parameter for subsequent use (block 523).

Figure 6:
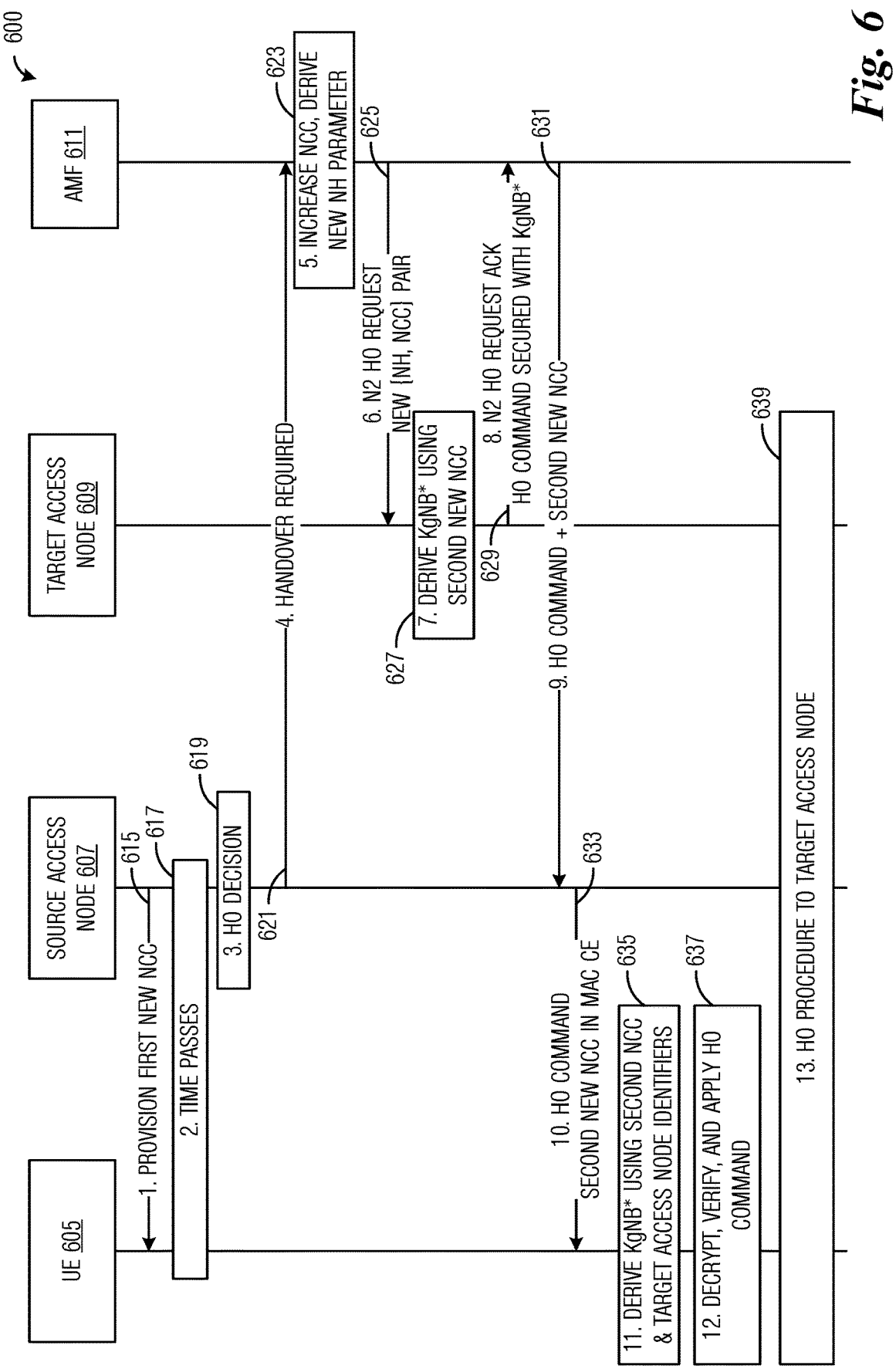
FIG. 6 illustrates a diagram highlighting communications exchanged and processing performed by devices participating in an N2 HO with security parameter update in the HO command according to example embodiments described herein.

FIG. 6 illustrates a diagram 60000 highlighting communications exchanged and processing performed by devices participating in an N2 HO with security parameter update in the HO command. Diagram 60000 highlights communications exchanged and processing performed by a UE 605, a source AN 607, a target AN 609, and an AMF 611 participating in an N2 HO with security parameter update in the HO command.

Source AN 607 has knowledge of the security parameter (e.g., an NCC), from a legacy security procedure, for example, that is to be provisioned to UE 605 and sends the security parameter to UE 605 (event 615). In other words, event 615 comprises provisioning the security parameter to UE 605. UE 605 is mobile, and over time (block 617), UE 605 moves out of coverage of source AN 607 or the quality of a channel between UE 605 and source AN 607 otherwise drops. Source AN 607 determines that UE 605 should handover to another AN (block 619). Source AN 607 sends a HO required message to AMF 611, the HO required message informing AMF 611 that UE 605 needs a HO (event 621). AMF 611 increases the security parameter for UE 605, thereby producing a new security parameter, and derives a NH parameter for UE 605 (block 623), thereby producing a new {NH, new security parameter} information pair.

AMF 611 sends an N2 HO request message to target AN 609, which has been identified as a candidate AN for UE 605 (event 625). The N2 HO request message includes the {NH, new security parameter} information pair. Target AN 609 derives a security key KgNB\* in accordance with the new security parameter received in the {NH, new security parameter} information pair (block 627). The security key KgNB\* may also be derived in accordance with information related to target AN 609. Target AN 609 sends an N2 HO request acknowledgement to AMF 611 (event 629). The N2 HO request acknowledgement may be secured (e.g., encrypted or signed) using the security key KgNB\* (as derived by target AN 609). As an example, the N2 HO request acknowledgement may comprise an encrypted version of a HO command message, encrypted by the security key KgNB\*. The HO command may be carried to UE 605 by a variety of messages, such as an RRCConnectionReconfiguration message, for example.

AMF 611 sends the HO command and the new security parameter to source AN 607 (event 631). The HO command may be encrypted using the security key KgNB\* as derived by target AN 609. Source AN 607 sends the HO command and the new security parameter to UE 605 (event 633). The new security parameter may be included in a MAC CE, in a PDCP header, or in similar lower layer signaling, external to the encrypted HO command. UE 605, upon receipt of the HO command and the new security parameter, overrides its stored security parameter with the new security parameter.

UE 605 derives its own version of security key KgNB\* in accordance with the new security parameter and information associated with target AN 609 (block 635). As an example, the information associated with target AN 609 includes identifiers of target AN 609. UE 605 decrypts and verifies the HO command using its derived security key KgNB\* (block 637). If the HO command decrypts and verifies successfully, UE 605 also applies the HO command. UE 605 uses the new security key to interpret the HO command, as well as verify the identity of target AN 609. As an example, if UE 605 uses information associated with a different target AN, the HO command would not decrypt properly. The application of the HO command results in the completion of the N2 HO procedure using the new security key and UE 605 is now served by target AN 609 (block 639).

Figure 7:
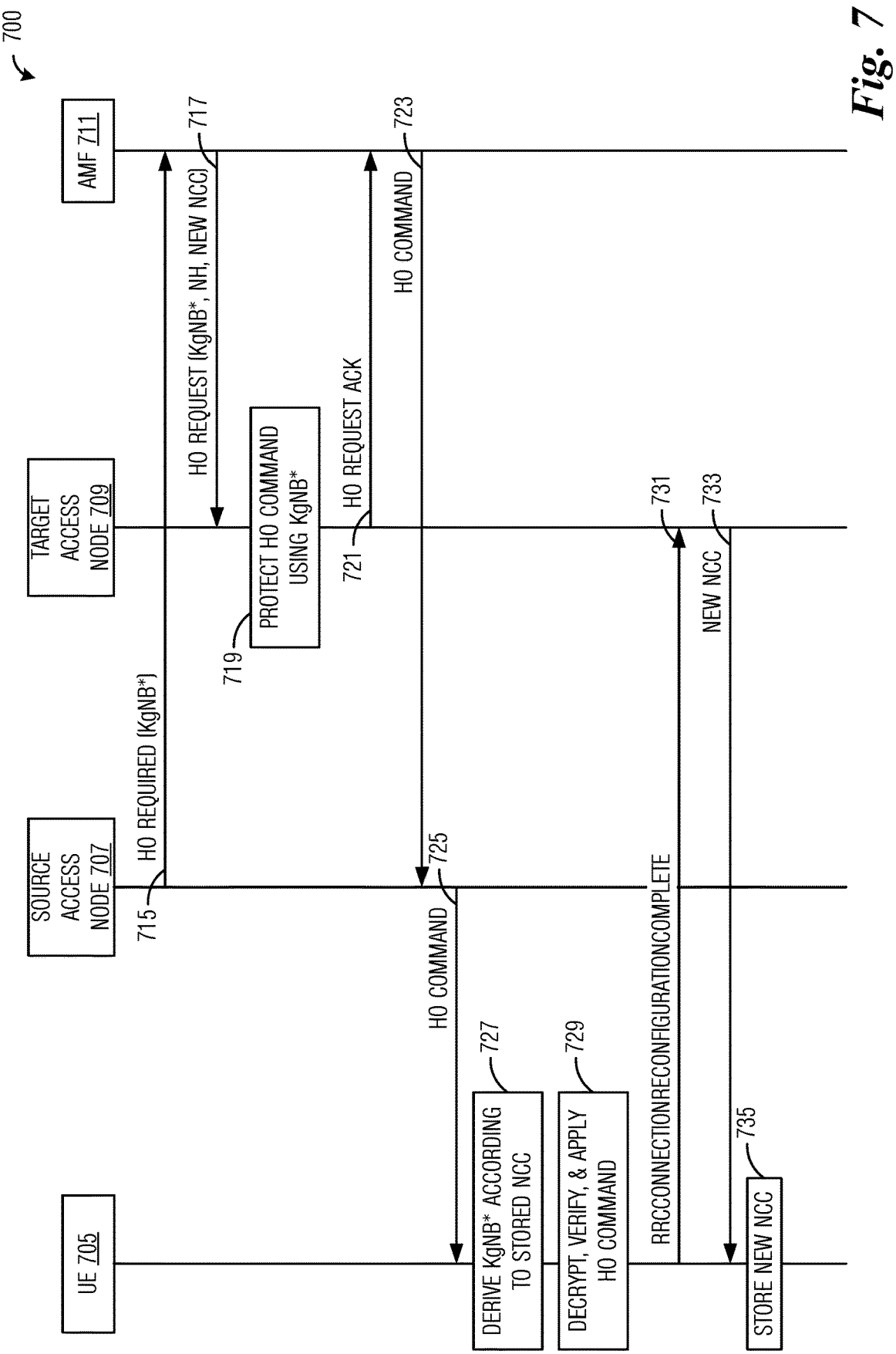
FIG. 7 illustrates a diagram highlighting communications exchanged and processing performed by devices participating in an N2 HO without security parameter update in the HO command according to example embodiments described herein.

FIG. 7 illustrates a diagram 700 highlighting communications exchanged and processing performed by devices participating in an N2 HO without security parameter update in the HO command. Diagram 700 highlights communications exchanged and processing performed by a UE 705, a source AN 707, a target AN 709, and an AMF 711 participating in an N2 HO without security parameter update in the HO command.

In the situation where an N2 HO occurs without the security parameter update included in the HO command, the security parameter may be provisioned for UE 705 in advance, which is similar to the Xn HO. Source AN 707 triggers an N2 HO by sending an N2 HO required message including security key KgNB\* to AMF 711 (event 715). AMF 711 sends a HO request message including the security key KgNB\*, a newly derived NH, and an updated security parameter to target AN 709 (event 717). It is noted that KgNB\* is not derived in accordance with the newly derived NH and the updated security parameter, but instead derived in accordance with the security parameter that was provisioned for UE 705 in advance.

Target AN 709 generates its own HO command (e.g., a RRCConnectionReconfiguration message) and secures (e.g., encrypts or signs) the HO command with the security key KgNB\* (block 719). Target AN 709 sends the secured HO command (in a secured container, for example) to AMF 711 (event 721), without including the updated security parameter. The secured HO command may be contained in or carried by a HO request acknowledgement. The secured HO command is forwarded to source AN 705 by AMF 711

(event 723). The secured HO command is forwarded to UE 705 by source AN 705 (event 725).

UE 705 derives its own version of security key KgNB* in accordance with its stored version of the security parameter (block 727). It is noted that the stored version of the security parameter is different in value from the new security parameter generated by AMF 711 and known by target AN 709. UE 705 decrypts and verifies the secured HO command using its derived security key KgNB* (block 729). If the secured HO command decrypts and verifies successfully, UE 705 also applies the decrypted HO command. The application of the decrypted HO command results in the completion of the N2 HO procedure and UE 705 is now served by target AN 709. UE 705 sends a message to target AN 709 to convey to target AN 709 that the N2 HO procedure is complete (event 731). The message may be an RRCConnectionReconfigurationComplete message, for example. Target AN 709 sends the new security parameter to UE 705 (event 733). UE 705 stores the new security parameter for subsequent use (block 735).

It is noted that providing the security parameter earlier allows for earlier security key derivation, which allows for the security key to be used in connection re-establishment procedures. The ability to use the security key in connection re-establishment is logical for symmetry reasons, especially if the security key is used for connection resume procedures. This is true if connection re-establishment is used to recover from connection resume failures.

If the HO fails during the HO process, the UE may send a connection re-establishment request (e.g., an RRCConnectionReestablishmentRequest message) to an AN that is a potential serving AN. If the AN has received HO preparation signaling, the AN can verify the re-establishment request. It is noted that the re-establishment request may be integrity protected but not ciphered. Not ciphering the re-establishment request allows an AN that does not have the UE context of the UE to recognize the re-establishment request. The AN may reject the re-establishment request, but the AN may also perform a UE context fetch from the source AN of the UE to allow the connection re-establishment to complete. Integrity protecting the re-establishment request allows the AN to verify the authenticity of the re-establishment request after performing the UE context fetch. Alternatively, integrity protecting the re-establishment request allows the source AN of the UE to verify the authenticity of the re-establishment request before transferring the UE context to the potential serving AN. It is noted that the AN (if different from the source AN or the target AN) will have a different security key (e.g., KgNB*) due to different inputs that are specific to the AN, for example, different identifiers (such as cell identifiers, and so on) that are provided to the key derivation function (KDF).

Figure 8:
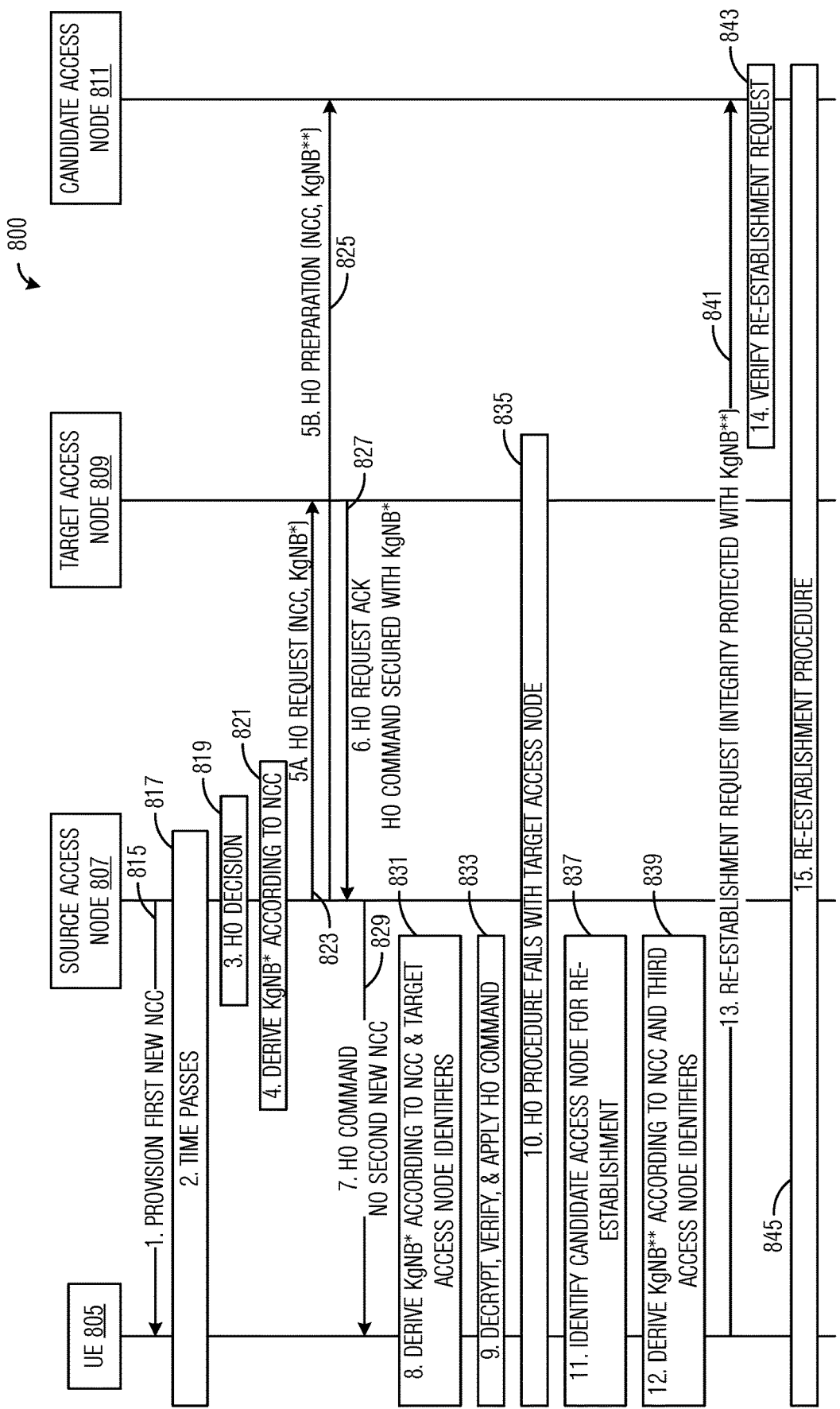
FIG. 8 illustrates a diagram highlighting communications exchanged and processing performed by devices participating in a connection re-establishment procedure with a provisioned security parameter after a failed HO procedure according to example embodiments described herein.

FIG. 8 illustrates a diagram 800 highlighting communications exchanged and processing performed by devices participating in a connection re-establishment procedure with a provisioned security parameter after a failed HO procedure. Diagram 800 highlights communications exchanged and processing performed by a UE 805, a source AN 807, a target AN 809, and a candidate AN 811 participating in a connection re-establishment procedure with a provisioned security parameter after a failed HO procedure.

Source AN 807 has knowledge of the security parameter (e.g., an NCC), from a legacy security procedure, for example, that is to be provisioned to UE 805 and sends the security parameter to UE 805 (event 815). In other words, event 815 comprises provisioning the security parameter to UE 805. UE 805 is mobile, and over time (block 817), UE 805 moves out of coverage of source AN 807 or the quality of a channel between UE 805 and source AN 807 otherwise drops. Source AN 807 determines that UE 805 should handover to another AN (block 819). It is noted that the security parameter has been provided to UE 805 prior to the handover procedure in event 815. Hence, when UE 805 attempts to re-establish its connection with source AN 807, the security parameter may be used to derive a new security key to be used in securing communications with source AN 807. Source AN 807 derives a first security key KgNB* in accordance with the security parameter (block 821). Source AN 807 also identifies candidate AN 811 as a possible serving AN for UE 805. The new security key may also be derived in accordance with information associated with target AN 809. The information associated with target AN 809 may include one or more identifiers of target AN 407.

Source AN 807 sends a HO request message including the security parameter and the first security key KgNB* to target AN 809 (event 823). Source AN 809 also sends a HO preparation message including the security parameter and a second security key KgNB, derived in accordance with the security parameter and information associated with candidate AN 811, to candidate AN 811 (event 825). Target AN 809 sends a HO request acknowledgement to source AN 807 (event 827). The HO request acknowledgement may comprise a secured version of a HO command. As an example, the target AN 809** secures (e.g., encrypts or signs) the HO command with the first security key KgNB*. Source AN 807 sends the HO command to UE 805, but may not include the security parameter (event 829). UE 805 is expected to know to use the security parameter previously received from source AN 807, in event 815, for example.

UE 805 derives its own version of the first security key KgNB* in accordance with the security parameter (block 831). The first security key KgNB* may also be derived in accordance with information associated with target AN 809. UE 805 decrypts and verifies the HO command, as well as applies the HO command if the HO command decrypted and verified (block 833). UE 805 uses the first security key KgNB* to interpret the HO command, as well as verify the identity of target AN 809. As an example, if UE 805 uses information associated with a different target AN, the HO command would not decrypt properly.

For discussion purposes, consider a scenario where the HO procedure fails (block 835). Reasons for HO failure may include failure to verify the HO command, failure to verify target AN 809, and so on. In such a situation, UE 805 identifies candidate AN 811 for connection re-establishment purposes (block 837). UE 805 derives its own version of the second security key KgNB in accordance with the security parameter (block 839). The second security key KgNB may also be derived in accordance with information associated with candidate AN 811. UE 805 sends a connection re-establishment request to candidate AN 811 (event 841). The connection re-establishment request may be integrity protected using the second security key KgNB. Similar to the HO procedure, the connection re-establishment request may be integrity protected but not ciphered. Alternatively, the connection re-establishment request may include an authentication token generated with the second security key KgNB. It is noted that this is a similar concept to the use of a short MAC-I in 3GPP LTE re-establishment, but the authentication token is generated with a new security key. Candidate AN 811 verifies the connection re-establishment request using its own version of the second security key KgNB (block 843). If the connection re-establishment request is verified, UE 805, source AN 807, and candidate AN 811 perform the connection re-establishment procedure (block 845**).

If a connection resume procedure (as part of the transition from RRC_INACTIVE to RRC_CONNECTED states) fails, due to a random access channel (RACH) procedure failure, for example, UE 805 may perform a connection re-establishment procedure as a recovery mechanism. In a process that is similar to the procedure for HO failure, UE 805 may use the security key derived from the security parameter (i.e., its own version of the first security key KgNB*) for the connection re-establishment procedure after the failure of the connection resume procedure.

It is noted that because the connection resume procedure does not include preparation of a "target" AN, UE 805 may only be able to successfully complete the connection re-establishment procedure with an AN that already holds the UE context of UE 805. Although this situation sounds unlikely, because a single CU controls many DUs (cells) covering a wide area, there is a high probability that UE 805 will resume under a different DU of the same AN.

FIG. 9 illustrates a flow diagram of example operations 900 occurring in an AN provisioning a security parameter for a UE. Operations 900 may be indicative of operations occurring in an AN as the AN provisions a security parameter, e.g., an NCC, for a UE.

Operations 900 begin with the AN performing a mobility or state transition procedure (block 905). The AN performs the authentication of the UE (block 907). The AN receives a UE context of the UE from an AMF, the UE context includes the security parameter (block 909). If the security parameter has previously been provisioned for the UE, the security parameter in the UE context is an updated version of the security parameter. If the security parameter has not been provisioned for the UE, the security parameter in the UE context may be an initial version of the security parameter. The AN sends a command with the security parameter to the UE (block 911). The AN derives a security key KgNB associated with the UE, the security key KgNB is derived in accordance with the security parameter (block 913). The AN applies security for one or more messages associated with the UE using the security key KgNB (block 915) and sends the one or more messages. It is noted that deriving the security key, applying security for the one or more messages, and sending the one or more messages may be referred to as performing a mobility related procedure.

FIG. 10 illustrates a flow diagram of example operations 1000 occurring in a UE being provisioned a security parameter. Operations 1000 may be indicative of operations in a UE as the UE is provisioned a security parameter, e.g., an NCC.

Operations 1000 begin with the UE performing a mobility or state transition procedure (block 1005). The UE performs an authentication procedure with the network to authenticate the UE (block 1007). The UE receives a command with the security parameter from an AN (block 1009). If the security parameter has previously been provisioned to the UE, the security parameter received in block 1009 is an updated version of the security parameter. If the security parameter has not been provisioned for the UE, the security parameter received in block 1009 may be an initial version of the security parameter. The UE stores the security parameter for subsequent use (block 1011). The UE sends a command response (block 1013). The sending of the command response may trigger a mobility related procedure. The UE derives a security key KgNB* in accordance with the security parameter (block 1015). The UE applies security for one or more messages using the security key KgNB* (block 1017). The one or more messages may be received by the UE, sent by the UE, or a combination thereof. It is noted that sending the command response (triggering the mobility related procedure), deriving the security key, and applying security to the one or more messages may be referred to as performing a mobility related procedure.

FIG. 11 illustrates a flow diagram of example operations 1100 occurring in an AMF participating in the provisioning of a security parameter for a UE. Operations 1100 may be indicative of operations occurring in an AMF as the AMF participates in the provisioning of a security parameter, e.g., an NCC, for a UE.

Operations 1100 begin with the AMF performing the authentication of the UE (block 1105). It is noted that other core network nodes may also be involved in the authentication procedure. The AMF provisions or updates the security parameter for the UE (block 1107). The AMF sends a UE context of the UE to an AN serving the UE (block 1109). The UE context includes the security parameter.

FIG. 12 illustrates a flow diagram of example operations 1200 occurring in a target AN updating a security parameter of a UE. Operations 1200 may be indicative of operations occurring in a target AN as the target AN updates the security parameter, e.g., an NCC, of the UE.

Operations 1200 begin with the target AN performing a HO procedure with the UE (block 1205). The target AN receives a new security parameter from an AMF (block 1207). The new security parameter value may be delivered in association with a path switch procedure. The target AN sends the new security parameter to the UE (block 1209). It is noted that the sending of the new security parameter does not trigger a security key update.

FIG. 13 illustrates a flow diagram of example operations 1300 occurring in a target AN participating in an N2 HO procedure. Operations 1300 may be indicative of operations occurring in a target AN as the target AN participates in an N2 HO procedure.

Operations 1300 begin with the target AN receiving a security key KgNB* and a new security parameter, e.g., an NCC, from an AMF as part of an N2 HO procedure (block 1305). The target AN secures a HO command using the security key KgNB* (block 1307). The target AN sends the secured HO command to the UE via the AMF (block 1309). The target AN participates in the N2 HO procedure with the UE (block 1311). The target AN sends the new security parameter to the UE (block 1313). It is noted that the sending of the new security parameter does not trigger a security key update.

Figures 14A, 14B:
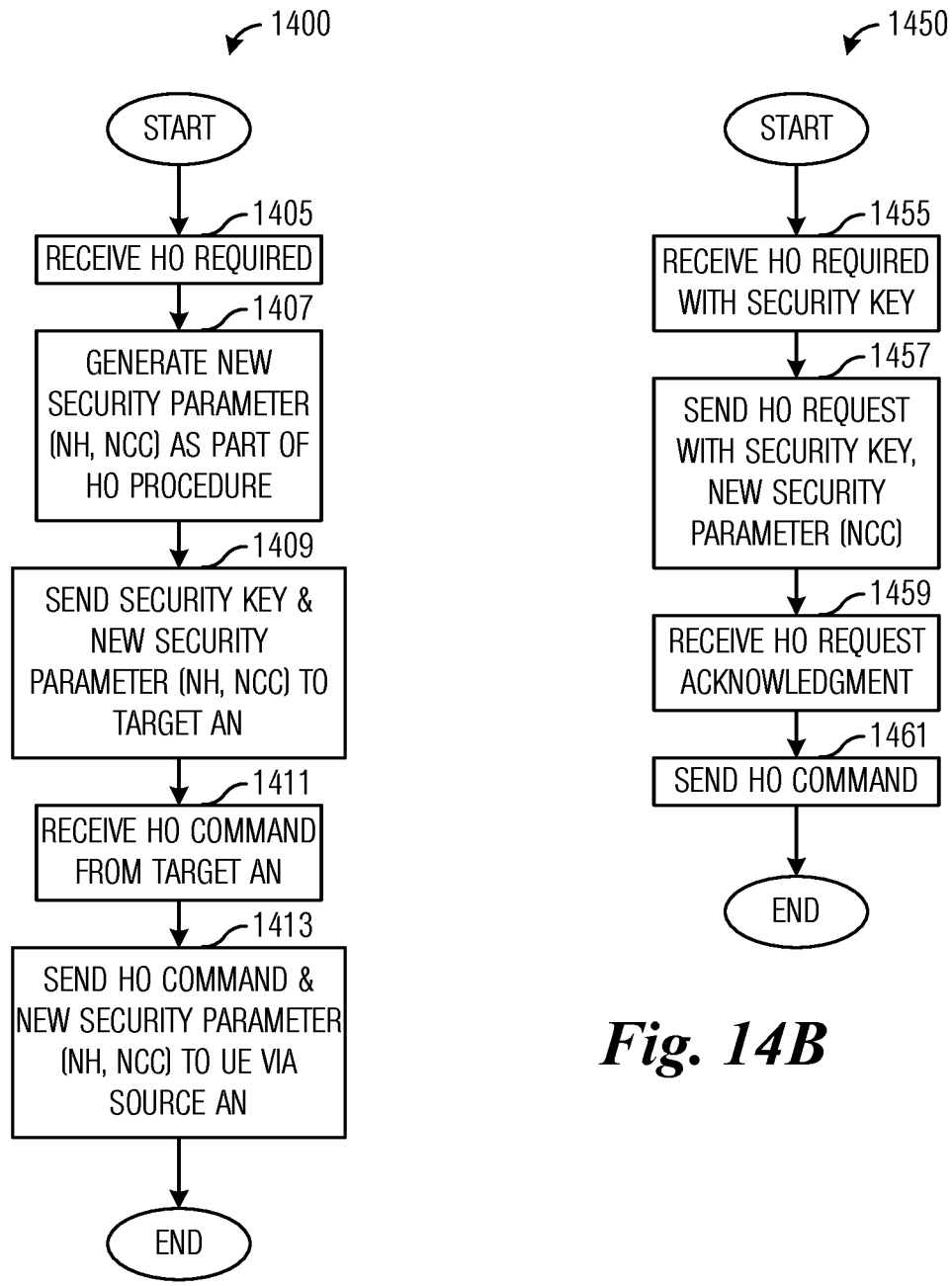
FIG. 14A illustrates a flow diagram of example operations occurring in an AMF participating in an N2 HO procedure according to example embodiments described herein.
FIG. 14B illustrates a flow diagram of example operations occurring in an AMF participating in an N2 HO procedure without security parameter update in the HO command according to example embodiments described herein.

FIG. 14A illustrates a flow diagram of example operations 1400 occurring in an AMF participating in an N2 HO procedure. Operations 1400 may be indicative of operations occurring in an AMF as the AMF participates in an N2 HO procedure.

Operation 1400 begin with the AMF receiving a HO required message (block 1405). The HO required message is received from the source AN, for example. The AMF generates one or more security parameters as part of the N2 HO procedure (block 1407). As an example, the one or more security parameters include an {NH, new security parameter} information pair. The AMF sends the one or more security parameters to a target AN (block 1409). The AMF receives a HO command that has been secured using a new security key KgNB* (block 1411). The AMF sends the HO command and the one or more security parameters to the UE (block 1413). The the HO command and the one or more security parameters may be sent to the UE via the source AN.

FIG. 14B illustrates a flow diagram of example operations 1450 occurring in an AMF participating in an N2 HO procedure without security parameter update in the HO command. Operations 1450 may be indicative of operations occurring in an AMF as the AMF participates in an N2 HO procedure without security parameter update in the HO command.

Operations 1450 begin with the AMF receiving a HO required message with a new security key KgNB* (block 1455). The HO required message is received from a source AN, for example. The AMF sends a HO request message including the new security key KgNB*, a newly derived NH, and an updated security parameter (block 1457). The HO request message is sent to a target AN. The AMF receives a HO request acknowledgement message (block 1459). The HO request acknowledgement message is received from the target AN. The AMF sends a HO command to a UE via the source AN (block 1461).

Figure 15:
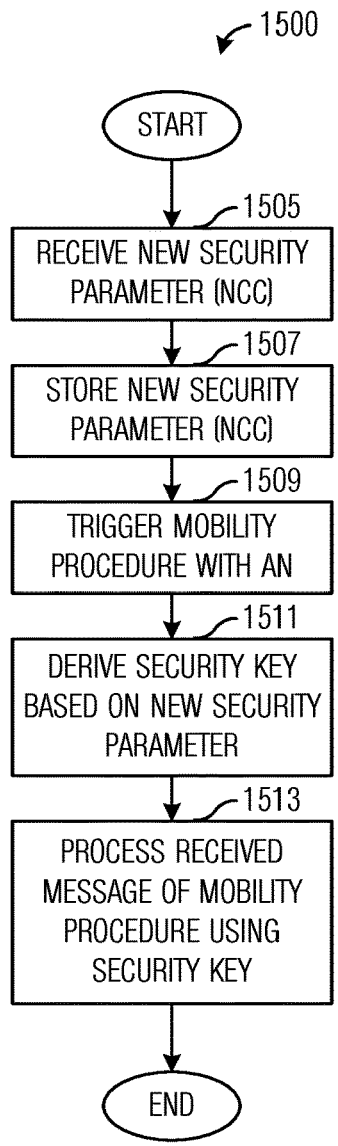
FIG. 15 illustrates a flow diagram of example operations occurring in a UE participating in a HO procedure according to example embodiments described herein.

FIG. 15 illustrates a flow diagram of example operations 1500 occurring in a UE participating in a HO procedure. Operations 1500 may be indicative of operations occurring in a UE as the UE participates in a HO procedure.

Operations 1500 begin with the UE receiving a new security parameter, e.g., an NCC (block 1505). The new security parameter may be received from a first network node, such as an AN or an AMF. The UE stores the new security parameter (block 1507). The UE triggers a mobility procedure with an AN (block 1509). Examples of the mobility procedure include a HO procedure, a connection establishment procedure, a connection resume procedure, or connection re-establishment procedure. The UE derives a security key KgNB* in accordance with the new security parameter (block 1511). The UE processes at least one received message of the mobility procedure using the security key KgNB* (block 1513).

Figure 16:
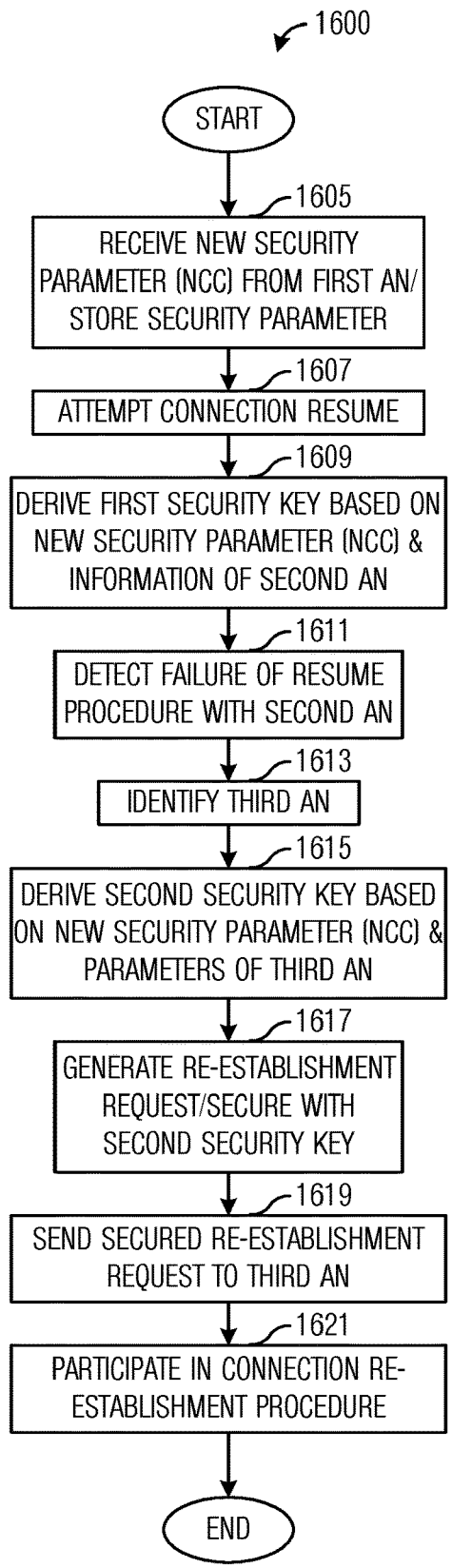
FIG. 16 illustrates a flow diagram of example operations occurring in a UE participating in a connection re-establishment procedure after a connection resume procedure failure according to example embodiments described herein.

FIG. 16 illustrates a flow diagram of example operations 1600 occurring in a UE participating in a connection re-establishment procedure after a connection resume procedure failure. Operations 1600 may be indicative of operations occurring in a UE as the UE participates in a connection re-establishment procedure after a connection resume procedure failure.

Operations 1600 begin with the UE receiving a new security parameter, e.g., a NCC, from a first AN (block 1605). The UE also stores the new security parameter. The UE attempts a resume procedure (block 1607). The UE derives a first security key KgNB* in accordance with the new security parameter and information associated with a second AN, a target AN, for example (block 1609). The information associated with the second AN may be identifiers of the second AN. The UE detects a failure of a connection resume procedure with the second AN (block 1611). The UE identifies a third AN (block 1613). The third AN may be a candidate AN for connection re-establishment, for example. The UE derives a second security key KgNB in accordance with the new security parameter and information associated with the third AN (block 1615). The information associated with the third AN may be identifiers of the third AN. The UE generates a connection re-establishment request and secures it in accordance with the second security key KgNB (block 1617). The UE sends the secured connection re-establishment request to the third AN (block 1619). The UE participates in the connection re-establishment procedure (block 1621).

Figure 17:
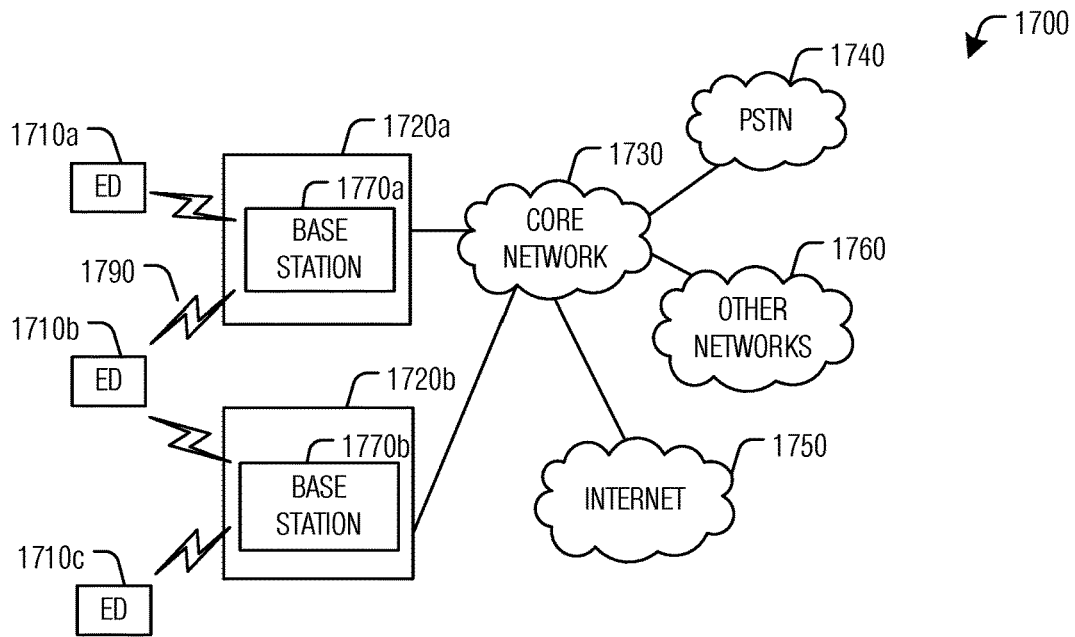
FIG. 17 illustrates an example communication system according to example embodiments described herein.

FIG. 17 illustrates an example communication system 1700. In general, the system 1700 enables multiple wireless or wired users to transmit and receive data and other content. The system 1700 may implement one or more channel access methods, such as code division multiple access (CDMA), time division multiple access (TDMA), frequency division multiple access (FDMA), orthogonal FDMIA (OFDMA), single-carrier FDVIA (SC-FDMA), or non-orthogonal multiple access (NOMA).

In this example, the communication system 1700 includes electronic devices (ED) 1710a-1710c, radio access networks (RANs) 1720a-1720b, a core network 1730, a public switched telephone network (PSTN) 1740, the Internet 1750, and other networks 1760. While certain numbers of these components or elements are shown in FIG. 17, any number of these components or elements may be included in the system 1700.

The EDs 1710a-1710c are configured to operate or communicate in the system 1700. For example, the EDs 1710a-1710c are configured to transmit or receive via wireless or wired communication channels. Each ED 1710a-1710c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1720a-1720b here include base stations 1770a-1770b, respectively. Each base station 1770a-1770b is configured to wirelessly interface with one or more of the EDs 17100a-1710c to enable access by the EDs to the core network 1730, the PSTN 1740, the Internet 1750, or the other networks 1760. For example, the base stations 1770a-1770b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 1710a-1710c are configured to interface and communicate with the Internet 1750 and may access the core network 1730, the PSTN 1740, or the other networks 1760.

In the embodiment shown in FIG. 17, the base station 1770a forms part of the RAN 1720a, which may include other base stations, elements, or devices. Also, the base station 1770b forms part of the RAN 1720b, which may include other base stations, elements, or devices. Each base station 1770a-1770b operates to transmit or receive wireless signals within a particular geographic region or area, sometimes referred to as a "cell." In some embodiments, multiple-input multiple-output (MIMO) technology may be employed having multiple transceivers for each cell.

The base stations 1770a-1770b communicate with one or more of the EDs 1710a-1710c over one or more air interfaces 1790 using wireless communication links. The air interfaces 1790 may utilize any suitable radio access technology.

It is contemplated that the system 1700 may use multiple channel access functionality, including such schemes as described above. In particular embodiments, the base stations and EDs implement 5G NR, LTE, LTE-A, or LTE-B. Of course, other multiple access schemes and wireless protocols may be utilized.

The RANs 1720a-1720b are in communication with the core network 1730 to provide the EDs 1710a-1710c with voice, data, application, Voice over Internet Protocol (VoIP), or other services. Understandably, the RANs 1720a-1720b or the core network 1730 may be in direct or indirect communication with one or more other RANs (not shown). The core network 1730 may also serve as a gateway access for other networks (such as the PSTN 1740, the Internet 1750, and the other networks 1760). In addition, some or all of the EDs 1710a-1710c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1750.

Although FIG. 17 illustrates one example of a communication system, various changes may be made to FIG. 17. For example, the communication system 1700 could include any number of EDs, base stations, networks, or other components in any suitable configuration.

Figure 18A:
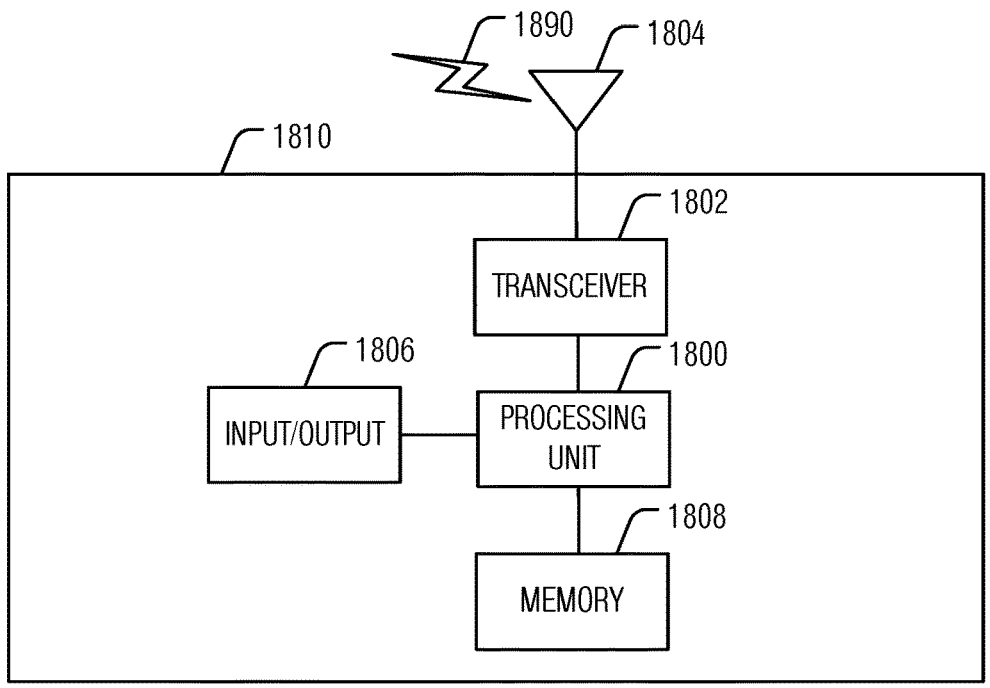
FIGS. 18A and 18B illustrate example devices that may implement the methods and teachings according to this disclosure.
Figure 18B:
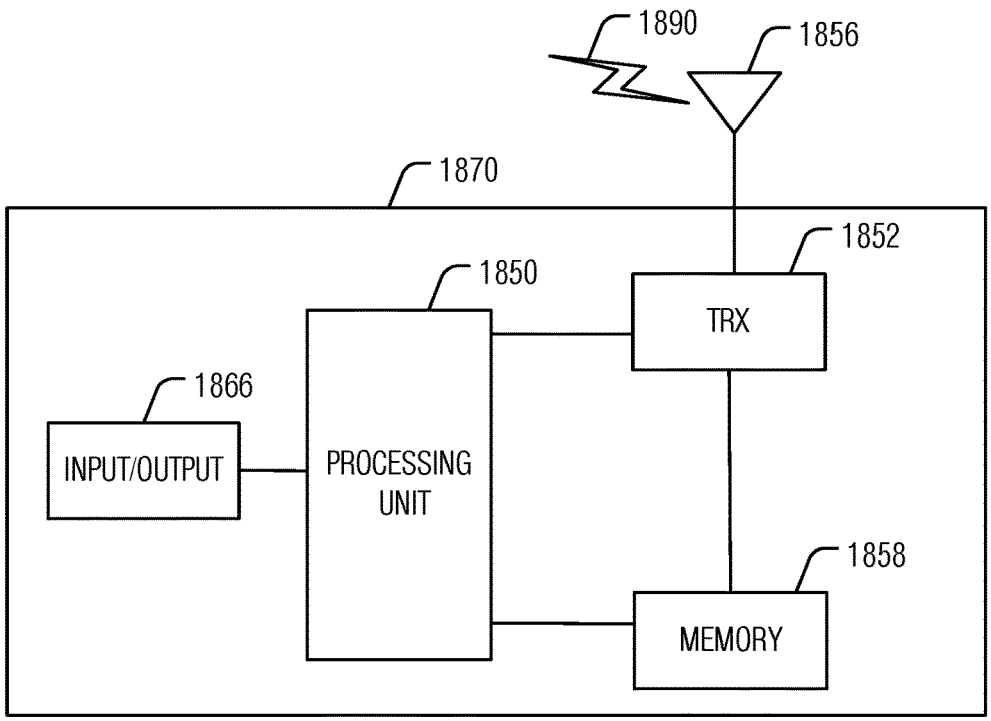

FIGS. 18A and 18B illustrate example devices that may implement the methods and teachings according to this disclosure. In particular, FIG. 18A illustrates an example ED 1810, and FIG. 18B illustrates an example base station 1870. These components could be used in the system 1700 or in any other suitable system.

As shown in FIG. 18A, the ED 1810 includes at least one processing unit 1800. The processing unit 1800 implements various processing operations of the ED 1810. For example, the processing unit 1800 could perform signal coding, data processing, power control, input/output processing, or any other functionality enabling the ED 1810 to operate in the system 1700. The processing unit 1800 also supports the methods and teachings described in more detail above. Each processing unit 1800 includes any suitable processing or computing device configured to perform one or more operations. Each processing unit 1800 could, for example, include a microprocessor, microcontroller, digital signal processor, field programmable gate array, or application specific integrated circuit.

The ED 1810 also includes at least one transceiver 1802. The transceiver 1802 is configured to modulate data or other content for transmission by at least one antenna or NIC (Network Interface Controller) 1804. The transceiver 1802 is also configured to demodulate data or other content received by the at least one antenna 1804. Each transceiver 1802 includes any suitable structure for generating signals for wireless or wired transmission or processing signals received wirelessly or by wire. Each antenna 1804 includes any suitable structure for transmitting or receiving wireless or wired signals. One or multiple transceivers 1802 could be used in the ED 1810, and one or multiple antennas 1804 could be used in the ED 1810. Although shown as a single functional unit, a transceiver 1802 could also be implemented using at least one transmitter and at least one separate receiver.

The ED 1810 further includes one or more input/output devices 1806 or interfaces (such as a wired interface to the Internet 1750). The input/output devices 1806 facilitate interaction with a user or other devices (network communications) in the network. Each input/output device 1806 includes any suitable structure for providing information to or receiving or providing information from a user, such as a speaker, microphone, keypad, keyboard, display, or touch screen, including network interface communications.

In addition, the ED 1810 includes at least one memory 1808. The memory 1808 stores instructions and data used, generated, or collected by the ED 1810. For example, the memory 1808 could store software or firmware instructions executed by the processing unit(s) 1800 and data used to reduce or eliminate interference in incoming signals. Each memory 1808 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 18B, the base station 1870 includes at least one processing unit 1850, at least one transceiver 1852, which includes functionality for a transmitter and a receiver, one or more antennas 1856, at least one memory 1858, and one or more input/output devices or interfaces 1866. A scheduler, which would be understood by one skilled in the art, is coupled to the processing unit 1850. The scheduler could be included within or operated separately from the base station 1870. The processing unit 1850 implements various processing operations of the base station 1870, such as signal coding, data processing, power control, input/output processing, or any other functionality. The processing unit 1850 can also support the methods and teachings described in more detail above. Each processing unit 1850 includes any suitable processing or computing device configured to perform one or more operations. Each processing unit 1850 could, for example, include a microprocessor, microcontroller, digital signal processor, field programmable gate array, or application specific integrated circuit.

Each transceiver 1852 includes any suitable structure for generating signals for wireless or wired transmission to one or more EDs or other devices. Each transceiver 1852 further includes any suitable structure for processing signals received wirelessly or by wire from one or more EDs or other devices. Although shown combined as a transceiver 1852, a transmitter and a receiver could be separate components. Each antenna 1856 includes any suitable structure for transmitting or receiving wireless or wired signals. While a common antenna 1856 is shown here as being coupled to the transceiver 1852, one or more antennas 1856 could be coupled to the transceiver(s) 1852, allowing separate antennas 1856 to be coupled to the transmitter and the receiver if equipped as separate components. Each memory 1858 includes any suitable volatile or non-volatile storage and retrieval device(s). Each input/output device 1866 facilitates interaction with a user or other devices (network communications) in the network. Each input/output device 1866 includes any suitable structure for providing information to or receiving or providing information from a user, including network interface communications.

Figure 19:
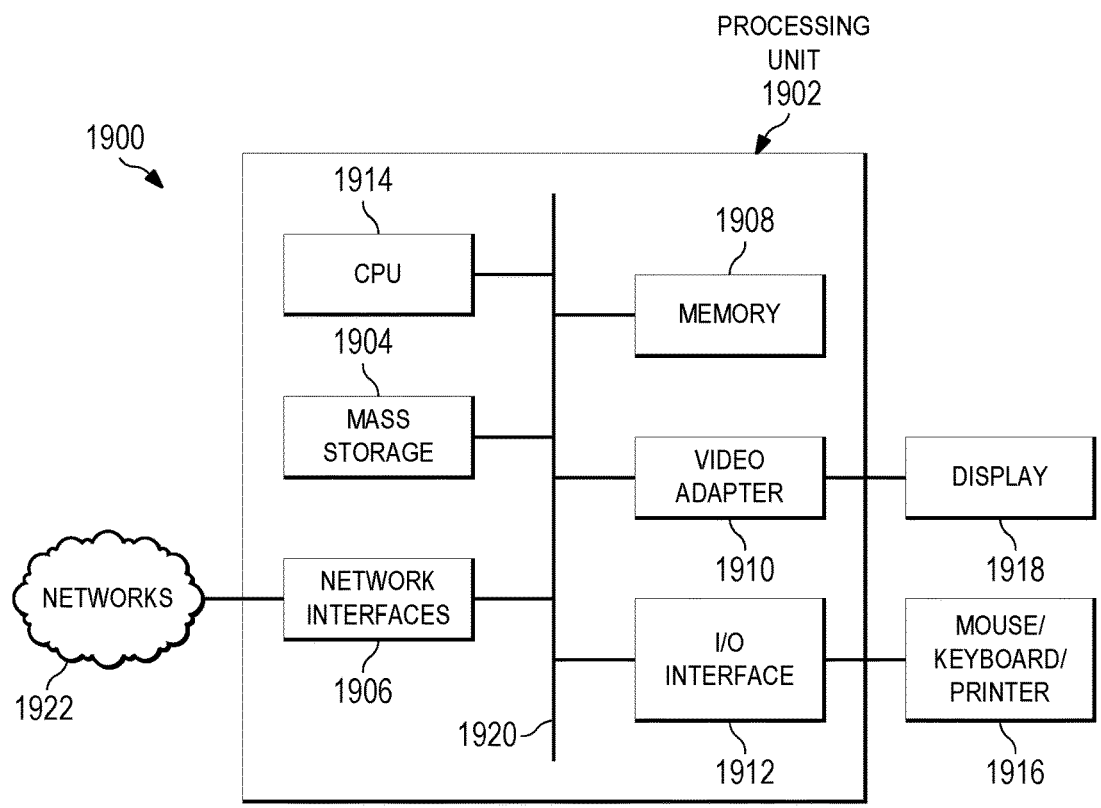
FIG. 19 is a block diagram of a computing system that may be used for implementing the devices and methods disclosed herein.

FIG. 19 is a block diagram of a computing system 1900 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1900 includes a processing unit 1902. The processing unit includes a central processing unit (CPU) 1914, memory 1908, and may further include a mass storage device 1904, a video adapter 1910, and an I/O interface 1912 connected to a bus 1920.

The bus 1920 may be one or more of any type of several bus architectures including a memory bus or memory controller, a peripheral bus, or a video bus. The CPU 1914 may comprise any type of electronic data processor. The memory 1908 may comprise any type of non-transitory system memory such as static random access memory (SRAM), dynamic random access memory (DRAM), synchronous DRAM (SDRAM), read-only memory (ROM), or a combination thereof. In an embodiment, the memory 1908 may include ROM for use at boot-up, and DRAM for program and data storage for use while executing programs.

The mass storage 1904 may comprise any type of non-transitory storage device configured to store data, programs, and other information and to make the data, programs, and other information accessible via the bus 1920. The mass storage 1904 may comprise, for example, one or more of a solid state drive, hard disk drive, a magnetic disk drive, or an optical disk drive.

The video adapter 1910 and the I/O interface 1912 provide interfaces to couple external input and output devices to the processing unit 1902. As illustrated, examples of input and output devices include a display 1918 coupled to the video adapter 1910 and a mouse, keyboard, or printer 1916 coupled to the I/O interface 1912. Other devices may be coupled to the processing unit 1902, and additional or fewer interface cards may be utilized. For example, a serial interface such as Universal Serial Bus (USB) (not shown) may be used to provide an interface for an external device.

The processing unit 1902 also includes one or more network interfaces 1906, which may comprise wired links, such as an Ethernet cable, or wireless links to access nodes or different networks. The network interfaces 1906 allow the processing unit 1902 to communicate with remote units via the networks. For example, the network interfaces 1906 may provide wireless communication via one or more transmitters or transmit antennas and one or more receivers or receive antennas. In an embodiment, the processing unit 1902 is coupled to a local-area network 1922 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a deriving unit or module, an applying unit or module, a performing unit or module, a triggering unit or module, an identifying unit or module, or a generating unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for operating a user equipment (UE) to communicate with provisioned security protection, the method comprising:
   receiving, by the UE from a source or serving access node (AN), a security parameter provisioned for the UE, the security parameter secured using a first security key;
   receiving, by the UE after receipt of the security parameter, a mobility command from the source or serving AN, the mobility command configuring a mobility procedure between the UE and a target or anchor AN that is different than the source or serving AN, the mobility command secured using a second security key derived from the received security parameter, the second security key different than the first security key, the mobility command associated with a handover procedure, a connection establishment procedure, or a connection resume procedure between at least the UE and the target or anchor AN; and
   transmitting or receiving, by the UE during the mobility procedure, at least one message to or from the target or anchor AN, the at least one message secured using the second security key derived from the received security parameter.

2. The method of claim 1, wherein the received security parameter is a next-hop chaining count (NCC) parameter.

3. The method of claim 1, wherein the second security key is further derived in accordance with a cell identifier of a cell operated by the target or anchor AN.

4. The method of claim 1, wherein the at least one message, that is transmitted or received during the mobility procedure, is integrity protected based on the second security key.

5. The method of claim 1, wherein the at least one message, that is transmitted or received during the mobility procedure, is encrypted based on the second security key.

6. The method of claim 1, wherein the mobility command is integrity protected based on the second security key.

7. The method of claim 1, wherein the mobility command is encrypted based on the second security key.

8. The method of claim 1, wherein the source or serving AN is a source AN, the target or anchor AN is a target AN, and the mobility procedure is associated with the handover procedure for handing over the UE from the source AN to the target AN.

9. The method of claim 1, wherein the source or serving AN is a serving AN, the target or anchor AN is an anchor AN, and the mobility procedure is the connection establishment procedure for establishing a connection between the UE and the anchor AN.

10. The method of claim 1, wherein the source or serving AN is a serving AN, the target or anchor AN is an anchor AN, and the mobility procedure is the connection resume procedure for resuming a connection between the UE and the anchor AN.

11. A user equipment (UE) adapted to communicate with provisioned security protection, the UE comprising:
    a memory storage comprising instructions; and
    one or more hardware processors in communication with the memory storage, wherein the one or more hardware processors execute the instructions to:
    receive, from a source or serving access node (AN), a security parameter provisioned for the UE, the received security parameter secured using a first security key;
    receive, after receipt of the received security parameter, a mobility command from the source or serving AN, the mobility command configuring a mobility procedure between the UE and a target or anchor AN that is different than the source or serving AN, the mobility command secured using a second security key derived from the received security parameter the mobility command associated with a handover procedure, a connection establishment procedure, or a connection resume procedure between at least the UE and the target or anchor AN; and
    transmit or receive, during the mobility procedure, at least one message to or from the target or anchor AN, the at least one message secured using the second security key derived from the received security parameter.

12. The UE of claim 11, wherein the received security parameter is a next-hop chaining count (NCC) parameter.

13. The UE of claim 11, wherein the second security key is further derived in accordance with a cell identifier of a cell operated by the target or anchor AN.

14. The UE of claim 11, wherein the at least one message, that is transmitted or received during the mobility procedure, is integrity protected based on the second security key.

15. The UE of claim 11, wherein the at least one message, that is transmitted or received during the mobility procedure, is encrypted based on the second security key.

16. The UE of claim 11, wherein the mobility command is integrity protected based on the second security key.

17. The UE of claim 11, wherein the mobility command is encrypted based on the second security key.

18. The UE of claim 11, wherein the source or serving AN is a source AN, the target or anchor AN is a target AN, and the mobility procedure is the handover procedure for handing over the UE from the source AN to the target AN.

19. The UE of claim 11, wherein the source or serving AN is a serving AN, the target or anchor AN is an anchor AN, and the mobility procedure is the connection establishment procedure for establishing a connection between the UE and the anchor AN.

20. The UE of claim 11, wherein the source or serving AN is a serving AN, the target or anchor AN is an anchor AN, and the mobility procedure is the connection resume procedure for resuming a connection between the UE and the anchor AN.

21. A method for operating a source or serving first access node (AN), the method comprising:
transmitting, by the source or serving AN to a user equipment (UE), a security parameter provisioned for the UE, the transmitted security parameter secured using a first security key; and
transmitting, by the source or serving AN after transmission of the transmitted security parameter, a mobility command to the UE, the mobility command configuring a mobility procedure between the UE and a target or anchor AN that is different than the source or serving AN, the mobility command secured using a second security key derived from the transmitted security parameter, the mobility command associated with a handover procedure, a connection establishment procedure, or a connection resume procedure between at least the UE and the target or anchor AN, wherein at least one message communicated during the mobility procedure is secured using the second security key derived from the transmitted security parameter.

22. The method of claim 21, wherein the transmitted security parameter is a next-hop chaining count (NCC) parameter.

23. The method of claim 21, wherein the second security key is further derived in accordance with a cell identifier of a cell operated by the target or anchor AN.

24. The method of claim 21, wherein the mobility command is integrity protected based on the second security key.

25. The method of claim 21, wherein the mobility command is encrypted based on the second security key.

26. The method of claim 21, wherein the source or serving AN is a source AN, the target or anchor AN is a target AN, and the mobility procedure is the handover procedure for handing over the UE from the source AN to the target AN.

27. The method of claim 21, wherein the source or serving AN is a serving AN, the target or anchor AN is an anchor AN, and the mobility procedure is the connection establishment procedure for establishing a connection between the UE and the anchor AN.

28. The method of claim 21, wherein the source or serving AN is a serving AN, the target or anchor AN is an anchor AN, and the mobility procedure is the connection resume procedure for resuming a connection between the UE and the anchor AN.

29. A source or serving access node (AN) comprising:
a memory storage comprising instructions; and
one or more hardware processors in communication with the memory storage, wherein the one or more hardware processors execute the instructions to:
transmit, to a user equipment (UE), a security parameter provisioned for the UE, the transmitted security parameter secured using a first security key; and
transmit, after transmission of the transmitted security parameter, a mobility command to the UE, the mobility command configuring a mobility procedure between the UE and a target or anchor AN that is different than the source or serving AN, the mobility command secured using a second security key derived from the transmitted security parameter, the mobility command associated with a handover procedure, a connection establishment procedure, or a connection resume procedure between at least the UE and the target or anchor AN wherein at least one message communicated during the mobility procedure is secured using the second security key derived from the transmitted security parameter.

30. The source or serving AN of claim 29, wherein the transmitted security parameter is a next-hop chaining count (NCC) parameter.

31. The source or serving AN of claim 29, wherein the second security key is further derived in accordance with a cell identifier of a cell operated by the target or anchor AN.

32. The source or serving AN of claim 29, wherein the mobility command is integrity protected based on the second security key.

33. The source or serving AN of claim 29, wherein the mobility command is encrypted based on the second security key.

34. The source or serving AN of claim 29, wherein the source or serving AN is a source AN, the target or anchor AN is a target AN, and the mobility procedure is the handover procedure for handing over the UE from the source AN to the target AN.

35. The source or serving AN of claim 29, wherein the source or serving AN is a serving AN, the target or anchor AN is an anchor AN, and the mobility procedure is the connection establishment procedure for establishing a connection between the UE and the anchor AN.

36. The source or serving AN of claim 29, wherein the source or serving AN is a serving AN, the target or anchor AN is an anchor AN, and the mobility procedure is the connection resume procedure for resuming a connection between the UE and the anchor AN.

* * * * *

UNITED STATES PATENT AND TRADEMARK OFFICE
CERTIFICATE OF CORRECTION

PATENT NO. : 10,812,973 B2
APPLICATION NO. : 15/987192
DATED : October 20, 2020
INVENTOR(S) : Tenny et al.

Page 1 of 1

It is certified that error appears in the above-identified patent and that said Letters Patent is hereby corrected as shown below:

In the Claims

In Column 21, Line 33, Claim 21, delete "first".

In Column 22, Line 33, Claim 29, delete "AN wherein" and insert --AN, wherein--.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*